United States Patent
Matthews, II

(10) Patent No.: US 12,521,823 B2
(45) Date of Patent: *Jan. 13, 2026

(54) BOLT ON POWER2

(71) Applicant: Worksite Lighting LLC, Haltom City, TX (US)

(72) Inventor: William Matthews, II, Haltom City, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/040,612

(22) Filed: Jan. 29, 2025

(65) Prior Publication Data

US 2025/0256364 A1   Aug. 14, 2025

Related U.S. Application Data

(63) Continuation-in-part of application No. 18/442,059, filed on Feb. 14, 2024, now Pat. No. 12,096,585.

(51) Int. Cl.
*B23K 37/02* (2006.01)

(52) U.S. Cl.
CPC .............................. *B23K 37/0258* (2013.01)

(58) Field of Classification Search
CPC ................................................. B23K 37/0258
See application file for complete search history.

(56) References Cited

U.S. PATENT DOCUMENTS

| | | | |
|---|---|---|---|
| 5,353,216 A | 10/1994 | Ayers et al. | |
| 10,046,411 B2 * | 8/2018 | Dessart | B23K 37/02 |
| 10,182,651 B2 | 1/2019 | Jost et al. | |
| 10,710,191 B2 * | 7/2020 | Schmitz | B23K 9/327 |
| 11,084,130 B2 * | 8/2021 | Dessart | B23K 37/0282 |
| 11,524,357 B2 * | 12/2022 | Dessart | B23K 9/1006 |
| 11,766,734 B2 | 9/2023 | Dessart et al. | |
| 11,766,735 B2 * | 9/2023 | Dessart | B23K 9/133 219/136 |
| 12,096,585 B1 | 9/2024 | Matthews, II et al. | |
| 12,275,098 B2 * | 4/2025 | Dessart | B23K 37/0294 |
| 2006/0044766 A1 | 3/2006 | Hartel et al. | |
| 2007/0256995 A1 | 11/2007 | Tenreiro et al. | |
| 2011/0204013 A1 * | 8/2011 | Lahti | B23K 37/0294 211/85.8 |

(Continued)

FOREIGN PATENT DOCUMENTS

GB   2506131   3/2014

OTHER PUBLICATIONS

"LEX Products-Welding Rack 6Pk to Locking Receptacle-WR6A-7SM-FG26DZ6LD-R", webpage <https://iscsales.com/item/lex-products-welding-rack-6pk-to-locking-receptacle-wr6a-7sm-fg26dz6ld-r/> two pages retrieved from the Internet on Feb. 12, 2024.

(Continued)

*Primary Examiner* — Robert J Hoffberg
(74) *Attorney, Agent, or Firm* — Examiners Edge; Gary ONeill

(57) ABSTRACT

An interoperable power distribution apparatus and systems includes N power distribution base units having a first configuration as sequentially arranged along a first direction and secured as removably attached, and a second configuration where each of the N power distribution base units are independently and removably attached to a surface or embedded at least in part to one of N welding machine support units having various first, second, or third orthogonal dimensions, the N power distribution base units interoperable between the N welding machine support units having varied first, second, or orthogonal third dimensions, wherein N is a positive natural number between 1 and 100.

20 Claims, 20 Drawing Sheets

(56) References Cited

U.S. PATENT DOCUMENTS

| | | | |
|---|---|---|---|
| 2014/0069906 A1 | 3/2014 | Dessart et al. | |
| 2015/0129568 A1 | 5/2015 | Miller | |
| 2015/0336197 A1 | 11/2015 | Delisio | |
| 2016/0136749 A1 | 5/2016 | Lee et al. | |
| 2017/0129035 A1* | 5/2017 | Westlake | B23K 9/1006 |
| 2017/0369087 A1 | 12/2017 | Dyson | |
| 2018/0358789 A1 | 12/2018 | Corbo et al. | |
| 2022/0200250 A1 | 6/2022 | Brooks et al. | |
| 2025/0273933 A1* | 8/2025 | Zhou | H05K 5/30 |

OTHER PUBLICATIONS

"Welding machine six pack", webpage <https://www.worksitelighting.com/product/welding-machine-six-pack/>, two pages retrieved from the Internet on Feb. 12, 2024.

"Modular Welding Station" by Southwire distributed via NNC, webpage <https://nassaunationalcable.com/products/modular-welding-station-991f3f2-3>, two pages retrieved from the Internet on Feb. 12, 2024.

"Orbicar Trolley", webpage <https://www.orbimax.com.au/collections/trolleys/products/orbicar-trolley>, two pages retrieved from the Internet on Feb. 12, 2024.

"Invertec® V276 8-Pack Rack", webpage <https://www.lincolnelectric.com/en/products/k4869-2>, three pages retrieved from the Internet on Feb. 12, 2024.

"Trystar Welding Racks", webpage <https://www.trystar.com/product/welding-racks/>, two pages retrieved from the Internet on Feb. 12, 2024.

International Search Report ISA 210 PCT/IB2024/056507.

Written Opinion of Patentability PCT/IB2024/056507-wosa-000040-en-US.

* cited by examiner

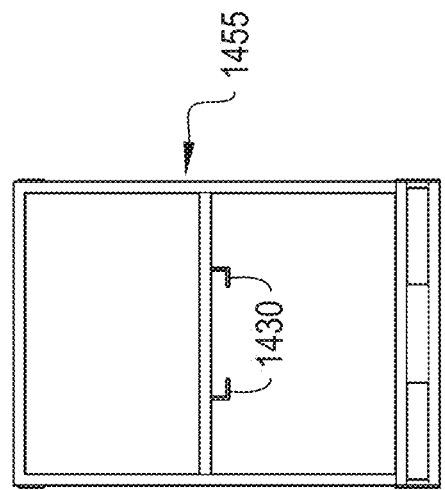
FIG. 14A
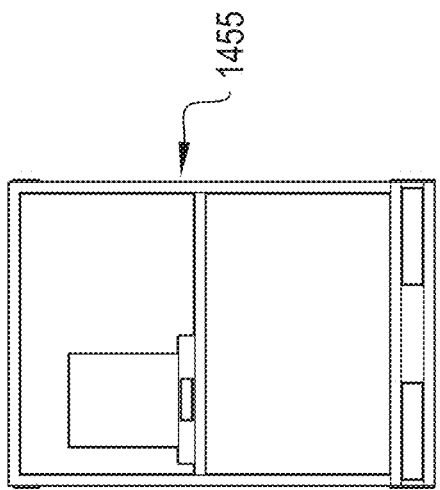
FIG. 14C
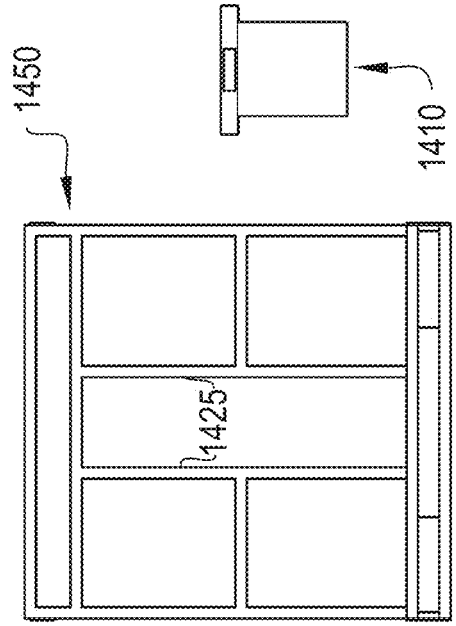
FIG. 14
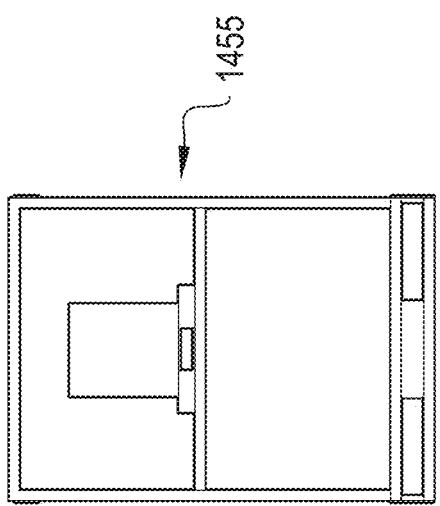
FIG. 14B
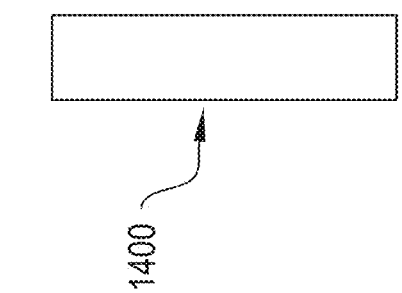

BOLT ON POWER2

RELATED APPLICATIONS

This application is a continuation in part of PCT International Application PCT/IB2024/056507 filed Jul. 3, 2024 entitled: "BOLT ON POWER"; which claims the benefit of U.S. Pat. No. 12,096,585, filed Feb. 14, 2024, entitled: "BOLT ON POWER". All of the PCT International Application and the US patent are incorporated by reference in their entirety.

STATEMENT OF GOVERNMENT INTEREST

N/A.

BACKGROUND

The industrial revolution ushered in a transition from a predominately agricultural economy which was substantially reliant upon manual processes and individualized human labor to a new era which began to harness the power of machines and coordinated labor to leverage production capacities. The industrial revolution further led to the development of factories and associated production lines to facilitate and orchestrate the man-machine cooperative efforts in a systematic manner. Many of the inventions of the twentieth century, including the automobile, the airplane, the personal computer, the television, and the mobile phone to name a few, are resultant from the discovery, development, and commercialization of industrial manufacturing technologies unleashed within modern factory environments.

Despite the undeniable beneficial impacts of these numerous technological advances, the modern era is nonetheless equally dependent on manufacturing and construction technologies that cannot be easily or completely performed within the confines of contemporary factory environments. Aviation, ship building, oil and gas drilling and development, and mining operations are exemplary of industries that demand the use of special manufacturing and construction techniques that, at least in some circumstances, are best performed outside of traditional factory-controlled environments. For example, there are a great number of industries that require welding operations on components and materials which are best performed outdoors, and often under sub-optimal working conditions. To address these needs, numerous equipment manufacturers have developed portable and relocatable welding machines and welding machine support structures which are capable of delivery, use, and removal from the various worksites and across whatever local geographic and environmental conditions are necessitated by the particular projects. While the various welding equipment manufacturers have facilitated the ability to perform specialized manufacturing and construction in situ, such as at a distant construction site, an unintended consequence of their achievements is that there is now a plethora of various types, designs, sizes, dimensions, and power requirements for the various welding equipment manufacturers products. As there is no standardized or universal design of welding equipment and associated support structures which are used by all of the various equipment manufacturers, the teams of personnel who are tasked to perform the specialized manufacturing and construction activities at the local or distant worksites are often hindered in selection of the most appropriate equipment needed to accomplish their work. This equipment selection process is compounded within the context of the high power, heavy weight, and high safety requirements of the types of equipment normally used for welding in harsh work environments.

SUMMARY OF THE INVENTION

The following provides a summary of certain exemplary embodiments of the present invention. This summary is not an extensive overview and is not intended to identify key or critical aspects or elements of the present invention or to delineate its scope. However, it is to be understood that the use of indefinite articles in the language used to describe and claim the present invention is not intended in any way to limit the described system. Rather the use of "a" or "an" should be interpreted to mean "at least one" or "one or more".

In accordance with one aspect of the present invention, an interoperable power distribution apparatus is provided. The interoperable power distribution apparatus includes a number N power distribution base units having a first configuration where the N power distribution base units are sequentially arranged along a first dimension such that the N power distribution base units when sequentially arranged along the first dimension are secured in sequence and removably attached. The N power distribution base units also have a second configuration wherein said N power distribution base units are not secured in sequence along at least a first dimension, and each of the N power distribution base units are independently and removably attached to at least one of a front, back, top, bottom or side surface of a respective one of N welding machine support units, each of the N welding machine support units have equal or unequal external first, second, or third orthogonal dimensions, the N power distribution base units are interoperable between the N welding machine support units having equal or unequal external first, second, or orthogonal third dimensions, when N is a positive natural number between 1 and 100.

In accordance with a second aspect of the present invention, the interoperable power distribution apparatus further includes a plurality of repositionable support brackets arranged along a surface of the N power distribution base units, the plurality of repositionable support brackets configured for positioning, movement, and secure repositioning of the plurality of repositionable support brackets for interoperability between the N welding machine support units constructed with equal or unequal external first, second, or third orthogonal dimensions to accommodate removable attachment to a variety of types of N welding machine support units.

In accordance with a third aspect of the present invention, the interoperable power distribution apparatus further includes one or more transformers electrically connectable to one or more power distribution blocks.

In accordance with a fourth aspect of the present invention, the interoperable power distribution apparatus further includes one or more removably attached light mast units each electrically connectable to one or more luminaires.

In accordance with a fifth aspect of the present invention, the interoperable power distribution apparatus further includes one or more magnetically attachable canopy lights.

In accordance with a sixth aspect of the present invention, the interoperable power distribution apparatus further includes one or more fork pockets configured to receive a plurality of forklift prongs.

In accordance with a seventh aspect of the present invention, the interoperable power distribution apparatus further includes one or more enclosure compartments configured for storage of at least one of cables, work tools, work materials, work parts, or work accessories.

In accordance with an eighth aspect of the present invention, the interoperable power distribution apparatus further includes a plurality of casters, rollers, or wheels.

In accordance with a ninth aspect of the present invention, the interoperable power distribution apparatus further includes a plurality of fastening regions for removable attachment of the N power distribution base units using components selected from apertures, pins, screws, bolts, clamps, nuts, and washers.

In accordance with a tenth aspect of the present invention, the interoperable power distribution apparatus further includes integrated, interconnecting electrical wiring wherein a plurality of N welding machine units, control boxes, power tools, luminaires, electrical receptacles, or other electrical devices are selectively powered using a unified electrical power input.

In accordance with a eleventh aspect of the present invention, an interoperable power distribution system includes a number N welding machine support units each including a frame structure configured to support N welding machine devices, the N welding machine support unit frame structures each further including a plurality of fastening regions for removable attachment of the frame structures to at least another frame structure, and additionally N power distribution base units have a first configuration wherein the N power distribution base units are sequentially arranged along at least a first dimension such that the N power distribution base units when sequentially arranged along the at least first dimension are secured in sequence and removably attached, and the N power distribution base units having a second configuration wherein the N power distribution base units are not secured in sequence along the at least a first dimension, each of the N power distribution base units are independently and removably attached to at least one of a front, back, top, bottom or side surface of a respective one of the N welding machine support units along at least one of the fastening regions, each of the N welding machine support units having equal or unequal external first, second, or third orthogonal dimensions, the N power distribution base units interoperable between the N welding machine support units having equal or unequal external first, second, or orthogonal third dimensions, wherein N is a positive natural number between 1 and 100.

In accordance with a twelfth aspect of the present invention, the interoperable power distribution system further includes a plurality of repositionable support brackets arranged along a surface of the N power distribution base units, the plurality of repositionable support brackets configured for positioning, movement, and secure repositioning of the plurality of repositionable support brackets for interoperability between the N welding machine support units constructed with equal or unequal external first, second, or third orthogonal dimensions to accommodate removable attachment to a variety of types of N welding machine support units.

In accordance with a thirteenth aspect of the present invention, the interoperable power distribution system includes a plurality of elongated beams and shelves arranged to support N welding machine devices.

In accordance with a fourteenth aspect of the present invention, the interoperable power distribution system further includes a plurality of fastening regions for removable attachment of the frame structures to at least another frame structure or at least one of the N power distribution base units, the fastening regions components including apertures, pins, screws, bolts, clamps, nuts, and/or washers.

In accordance with a fifteenth aspect of the present invention, the interoperable power distribution system further includes one or more transformers electrically connectable to one or more power distribution blocks.

In accordance with a sixteenth aspect of the present invention, the interoperable power distribution system further includes at least one of one or more removably attached light mast units each electrically connectable to one or more luminaires and one or more magnetically attachable canopy lights.

In accordance with a seventeenth aspect of the present invention, the interoperable power distribution system further includes one or more fork pockets configured to receive a plurality of forklift prongs.

In accordance with an eighteenth aspect of the present invention, the interoperable power distribution system further comprises one or more enclosure compartments configured for storage of at least one of cables, work tools, work materials, work parts, or work accessories.

In accordance with a nineteenth aspect of the present invention, the interoperable power distribution system further includes integrated, interconnecting electrical wiring wherein a plurality of N welding machine devices, control boxes, power tools, luminaires, electrical receptacles, or other electrical devices are selectively powered using a unified electrical power input.

In accordance with a twentieth aspect of the present invention, the interoperable power distribution system further includes one or more pigtail type connectors, one or more remote mounted outlet boxes, or both one or more pigtail type connectors and one or more remote mounted outlet boxes.

In accordance with a twenty-first aspect of the present invention, the interoperable power distribution apparatus includes N power distribution base units, said N power distribution base units having a first configuration wherein said N power distribution base units are each configured to be sequentially arranged along at least a first direction with at least another of said N power distribution base units such that said N power distribution base units when sequentially arranged along said at least said first direction are secured in sequence and removably attached; and a second configuration wherein said N power distribution base units are not configured to be secured in sequence along said at least said first direction, each of said N power distribution base units are independently and removably attached to at least one of front, back, top, bottom or side mount surfaces, or further embedded at least in part within a respective one of N welding machine support units, each of said N welding machine support units having equal or unequal external first, second, or third orthogonal dimensions, each of said N power distribution base units interoperable between any of said N welding machine support units, wherein N is a positive natural number between 1 and 100.

In accordance with a twenty-second aspect of the present invention, the interoperable power distribution apparatus includes wherein said N power distribution base units each further comprise a plurality of repositionable support brackets arranged along a surface of said N power distribution base units, said plurality of repositionable support brackets configured for positioning, movement, and secure repositioning of said plurality of repositionable support brackets for interoperability between said N welding machine support units constructed with said equal or unequal external first, second, or third orthogonal dimensions to accommodate removable attachment to a variety of types of said N welding machine support units.

In accordance with a twenty-third aspect of the present invention, the interoperable power distribution apparatus includes wherein said N power distribution base units are embedded at least in part within a respective one of N welding machine support units, said N power distribution base units each comprise a form factor allowing removable insertion within at least a portion of a perimeter of a frame of one of N welding machine support units such that one of said N power distribution base units is partially or fully enclosed within a perimeter of a frame of a respective one of N welding machine support units, said embedding allowing interoperability between said N power distribution base units and said N welding machine support units to accommodate removable attachment of said N power distribution base units to a variety of types of said N welding machine support units.

In accordance with a twenty-fourth aspect of the present invention, the interoperable power distribution apparatus includes wherein a tool management center removably attached to at least one of said front, back, top, bottom, side mount surfaces or embedded at least in part within said N welding machine support units, said tool management center including components selected from a group consisting of a power tool storage bracket, a hand tool storage bracket, a cord reel, a cord storage bracket, and mountable enclosures for storage for work supplies, welding cables, extension cords, and lights.

In accordance with a twenty-fifth aspect of the present invention, the interoperable power distribution apparatus includes wherein said N welding machine support units further comprise power cable routing and wiring protection selected from a group consisting of arrangements of penetrations, conduits, cable trays, and raceways.

In accordance with a twenty-sixth aspect of the present invention, the interoperable power distribution apparatus includes wherein said N welding machine support units further comprise a securement mechanism selected from a group consisting of lockable doors, reclosable screens, and side panels.

In accordance with a twenty-seventh aspect of the present invention, the interoperable power distribution apparatus includes wherein said N welding machine support units further comprise a universal welding machine mounting system including a locking plate removably attached to surface of a welding machine device and a lockable carrier retainer for slidably receiving said locking plate, wherein when a welding machine device is attached to said locking plate and slidably received into said lockable carrier retainer, said welding machine device is securely held in position by said lockable carrier retainer.

In accordance with a twenty-eighth aspect of the present invention, the interoperable power distribution apparatus includes wherein said N power distribution base units are fully embedded within a respective one of N welding machine support units, said N power distribution base units each comprise a form factor allowing removable insertion within a center portion of a perimeter of a frame of one of N welding machine support units, said N power distribution base units removably positionable between, above, or below one or more welding machine devices such that one of said N power distribution base units is fully enclosed within a perimeter of a frame of a respective one of N welding machine support units, said embedding allowing interoperability between said N power distribution base units and said N welding machine support units to accommodate removable attachment of said N power distribution base units to a variety of types of said N welding machine support units.

In accordance with a twenty-ninth aspect of the present invention, the interoperable power distribution apparatus includes wherein each of said N power distribution base units are removably attached to at least one of front, back, top, bottom or side mount surfaces of a respective one of N welding machine support units, and a universal platform, said universal platform arranged for structural support of at least one of N power distribution base units and at least one of N welding machine support units, each of said N welding machine support units having equal or unequal external first, second, or third orthogonal dimensions, each of said N power distribution base units interoperable between any of said N welding machine support units.

In accordance with a thirtieth aspect of the present invention, the interoperable power distribution apparatus includes wherein said N power distribution base units each further comprise a plurality of fastening regions for removable attachment of at least another of said N power distribution base units using components selected from a group consisting of apertures, pins, screws, bolts, clamps, nuts, and washers.

In accordance with a thirty-first aspect of the present invention, an interoperable power distribution system includes: N welding machine support units each comprising a frame structure configured to support at least one welding machine device, each frame structure comprising a plurality of fastening regions for removable attachment of each frame structure to at least another of said frame structure; and N power distribution base units, said N power distribution base units having: a first configuration wherein said N power distribution base units are each configured to be sequentially arranged along at least a first direction with at least another of said N power distribution base units such that said N power distribution base units when sequentially arranged along said at least said first direction are secured in sequence and removably attached; and a second configuration wherein said N power distribution base units are not configured to be secured in sequence along said at least said first direction, each of said N power distribution base units are independently and removably attached to at least one of front, back, top, bottom or side mount surfaces, or further embedded at least in part within a respective one of said N welding machine support units along at least one of said fastening regions, each of said N welding machine support units having equal or unequal external first, second, or third orthogonal dimensions, each of said N power distribution base units interoperable between any of said N welding machine support units, wherein N is a positive natural number between 1 and 100.

In accordance with a thirty-second aspect of the present invention, an interoperable power distribution system includes wherein said N power distribution base units each further comprise a plurality of repositionable support brackets arranged along a surface of said N power distribution base units, said plurality of repositionable support brackets configured for positioning, movement, and secure repositioning of said plurality of repositionable support brackets for interoperability between said N welding machine support units constructed with equal or unequal external first, second, or third orthogonal dimensions to accommodate removable attachment to a variety of types of N welding machine support units.

In accordance with a thirty-third aspect of the present invention, an interoperable power distribution system includes wherein each frame structure of said N welding machine support units further comprises a plurality of elongated beams and shelves arranged to support said at least one welding machine device; and said frame structure of said N welding machine support units and said N power distribution base units each comprise a plurality of fastening regions for removable attachment of at least another of said frame structure of said N welding machine support units and said N power distribution base units using components selected from a group consisting of apertures, pins, screws, bolts, clamps, nuts, and washers.

In accordance with a thirty-fourth aspect of the present invention, the interoperable power distribution system includes wherein said N power distribution base units are embedded at least in part within a respective one of N welding machine support units, said N power distribution base units each comprise a form factor allowing removable insertion within at least a portion of a perimeter of a frame of one of N welding machine support units such that one of said N power distribution base units is partially or fully enclosed within a perimeter of a frame of a respective one of N welding machine support units, said embedding allowing interoperability between said N power distribution base units and said N welding machine support units to accommodate removable attachment of said N power distribution base units to a variety of types of said N welding machine support units.

In accordance with a thirty-fifth aspect of the present invention, an interoperable power distribution system includes wherein comprising a tool management center removably attached to at least one of said front, back, top, bottom, side mount surfaces or embedded at least in part within said N welding machine support units, said tool management center including components selected from a group consisting of a power tool storage bracket, a hand tool storage bracket, a cord reel, a cord storage bracket, and mountable enclosures for storage for work supplies, welding cables, extension cords, and lights.

In accordance with a thirty-sixth aspect of the present invention, the interoperable power distribution system includes wherein said N welding machine support units further comprise power cable routing and wiring protection selected from a group consisting of arrangements of penetrations, conduits, cable trays, and raceways.

In accordance with a thirty-seventh aspect of the present invention, an interoperable power distribution system includes wherein said N welding machine support units further comprise a securement mechanism selected from a group consisting of lockable doors, reclosable screens, and side panels.

In accordance with a thirty-eighth aspect of the present invention, an interoperable power distribution system of includes wherein said N welding machine support units further comprise a universal welding machine mounting system including a locking plate removably attached to surface of a welding machine device and a lockable carrier retainer for slidably receiving said locking plate, wherein when a welding machine device is attached to said locking plate and slidably received into said lockable carrier retainer, said welding machine device is securely held in position by said lockable carrier retainer.

In accordance with a thirty-ninth aspect of the present invention, an interoperable power distribution system includes wherein said N power distribution base units are fully embedded within a respective one of N welding machine support units, said N power distribution base units each comprise a form factor allowing removable insertion within a center portion of a perimeter of a frame of one of N welding machine support units, said N power distribution base units removably positionable between, above, or below one or more welding machine devices such that one of said N power distribution base units is fully enclosed within a perimeter of a frame of a respective one of N welding machine support units, said embedding allowing interoperability between said N power distribution base units and said N welding machine support units to accommodate removable attachment of said N power distribution base units to a variety of types of said N welding machine support units.

In accordance with a fortieth aspect of the present invention, an interoperable power distribution system includes wherein each of said N power distribution base units are removably attached to at least one of front, back, top, bottom or side mount surfaces of a respective one of N welding machine support units, and a universal platform, said universal platform arranged for structural support of at least one of N power distribution base units and at least one of N welding machine support units, each of said N welding machine support units having equal or unequal external first, second, or third orthogonal dimensions, each of said N power distribution base units interoperable between any of said N welding machine support units.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF DRAWINGS

The accompanying drawings, which are incorporated into and form a part of the specification, schematically illustrate one or more exemplary embodiments of the invention and, together with the general description given above and detailed description given below, serve to explain the principles of the invention, and wherein:

FIG. 14 is a perspective view of a welding machine support unit frame and an embedded power distribution base unit in accordance with an exemplary embodiment of the present invention;

FIG. 14A is a perspective view of another welding machine support unit frame and an embeddable power distribution base unit in accordance with another exemplary embodiment of the present invention;

FIG. 14B is a perspective view of another welding machine support unit frame and an embedded power distribution base unit in accordance with another exemplary embodiment of the present invention;

FIG. 14C is a perspective view of another welding machine support unit frame and an embedded power distribution base unit in accordance with another exemplary embodiment of the present invention;

DETAILED DESCRIPTION

Figure 1:
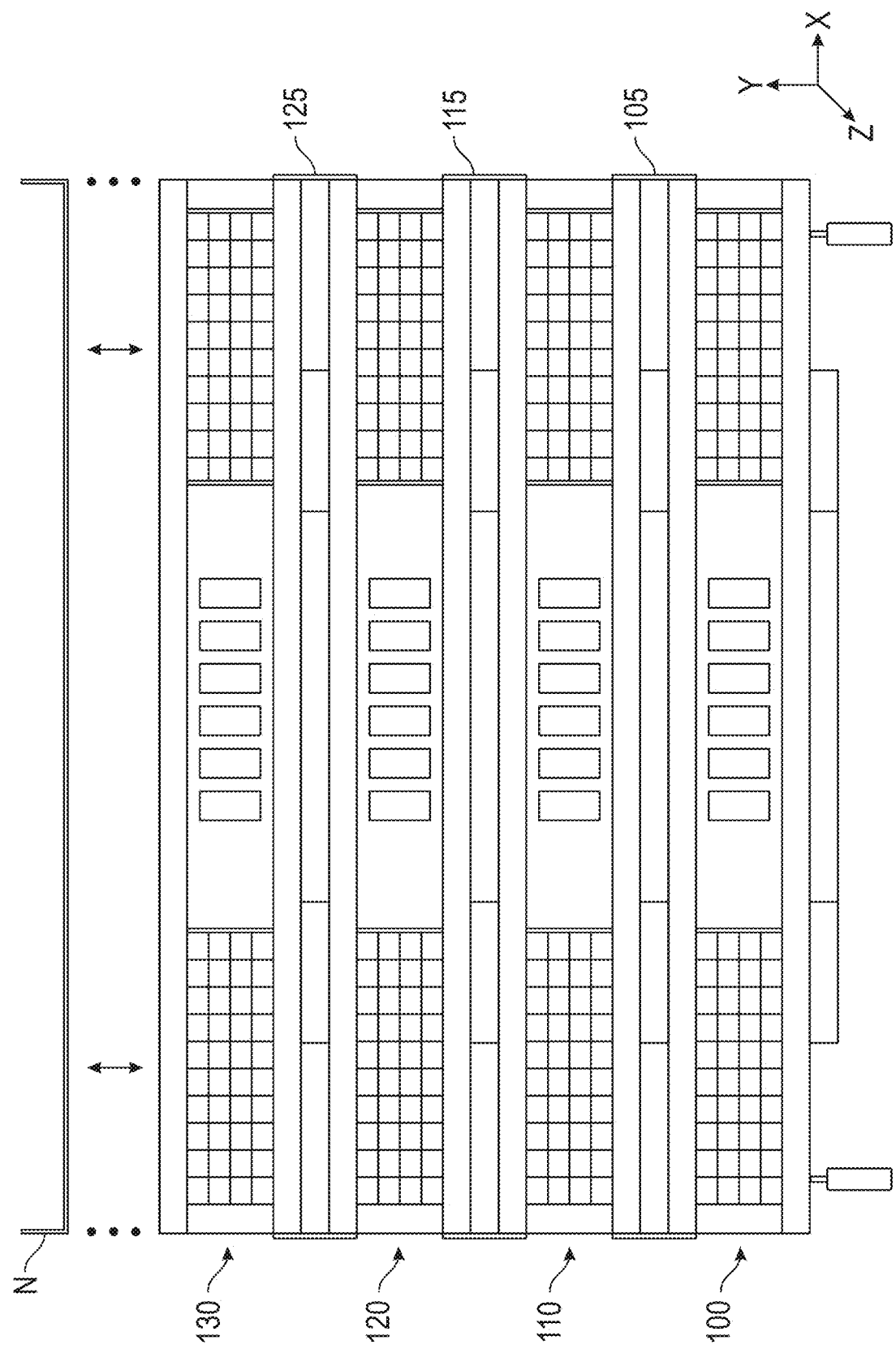
FIG. 1 is a perspective view of a plurality of power distribution base units in a first configuration in accordance with an exemplary embodiment of the present invention.

Exemplary embodiments of the present invention are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

As used herein, first, second, and third directions are mutually orthogonal and may include X, Y, and Z axis mutually orthogonal directions.

As used herein the term interoperable includes those qualities of an apparatus or systems which allow for universal connectivity between disparate apparatus and systems which would otherwise be in some aspect incompatible with one another, for example, whether such incompatibilities are essentially of a mechanical or an electrical nature.

As used herein the phrase "form factor" refers to the physical characteristics of a component or an apparatus including size, configuration, shape, layout, weight, mounting types, or other physical arrangement.

Figure 5:
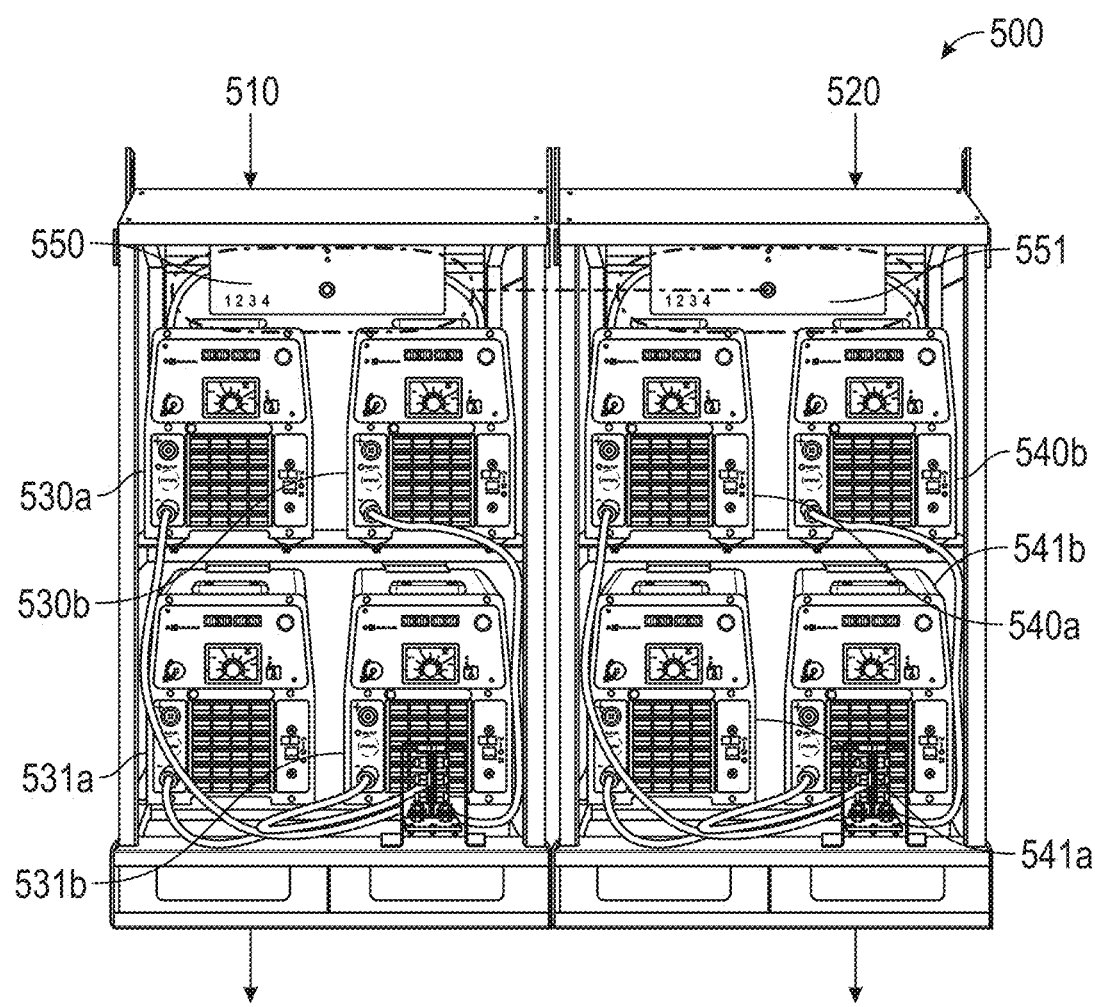
FIG. 5 is a perspective view of a conventional welding machine support unit for supporting prior art welding machines.

As best shown in FIG. 5, a pair of side-by-side prior art welding machine support units 500 include a first prior art welding machine support unit 510 and a second prior art welding machine support unit 520 are depicted. The first prior art welding machine support unit 510 includes at least upper and lower shelf areas, and as shown an upper shelf area supports a first welding machine 530a and a second welding machine 530b, while a lower shelf area supports a first welding machine 531a and a second welding machine 531b. Moreover, the second prior art welding machine support unit 520 includes at least upper and lower shelf areas, and as shown an upper shelf area supports a first welding machine 540a and a second welding machine 540b, while a lower shelf area supports a first welding machine 541a and a second welding machine 541b. The first prior art welding machine support unit 510 also includes a first welding rack control box 550, while the second prior art welding machine support unit 520 also includes a second welding rack control box 551. Each of the first welding rack control box 550 and the second welding rack control box 551 include various electrical control circuits which are configured to supply the design voltage, current, and power requirements to their respective welding machines 530a, 530b, 531a, 531b, 540a, 540b, 541a and 541b. In FIG. 5, the first prior art welding machine support unit 510 is a four-pack rack system and the second prior art welding machine support unit 520 is also a four-pack rack system, both four pack rack systems are commercially available from the same manufacturer, and thus are of comparable dimensions. The compatibility in electrical requirements, three-dimensional space requirements, and weight bearing requirements of each of these four pack rack systems when used together to support groups of welding machines supplied by a single manufacturer allows for convenient use by work crews engaged in welding and construction activities at worksites.

Figure 10:
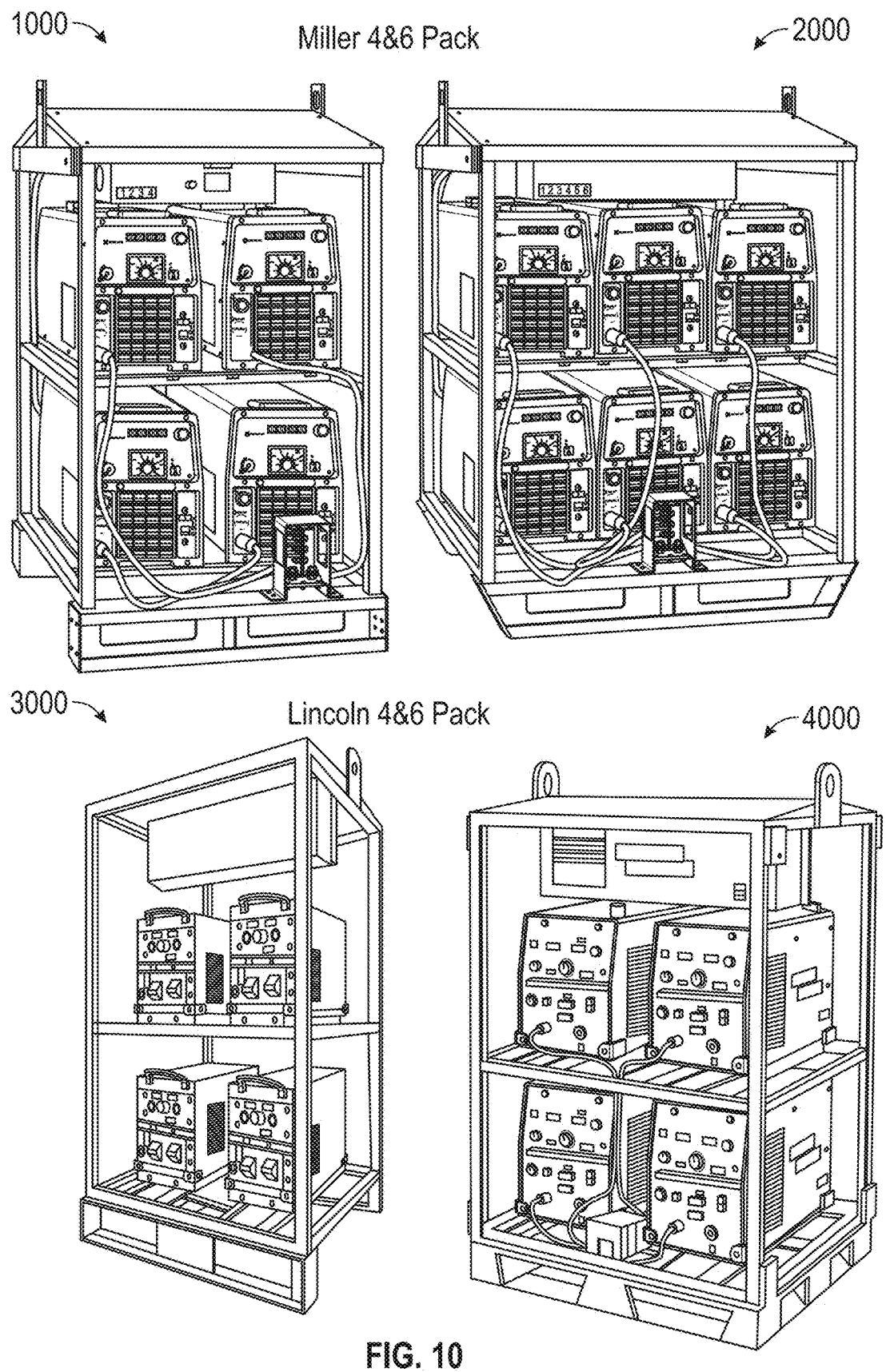
FIG. 10 is a perspective view of a plurality of conventional welding machine support units of various dimensions for supporting various prior art welding machine configurations.

FIG. 10 shows a first prior art welding machine support unit 1000 having a four-pack welding machine support capacity on upper and lower shelves and a second prior art welding machine support unit 2000, having a six-pack welding machine support capacity on upper and lower shelves. The first prior art welding machine support unit 1000 (which is essentially similar to welding machine support units 510 and 520), along with the supported four pack welding machines, and the second prior art welding machine support unit 2000, along with the supported six pack welding machines, are designed and supplied by a single vendor manufacturer A. Additionally, a third prior art welding machine support unit 3000 having a four pack welding machine support capacity on upper and lower shelves and a fourth prior art welding machine support unit 4000, having a four pack welding machine support capacity on upper and lower shelves is depicted. The third prior art welding machine support unit 3000, along with the supported four pack welding machines, and the fourth prior art welding machine support unit 4000, along with the supported four pack welding machines, are each designed and supplied by a single vendor manufacturer B. Although the first prior art welding machine support unit 1000, the third prior art welding machine support unit 3000 and the fourth prior art welding machine support unit 4000 are each designed to support four pack welding machines, it is apparent to those of ordinary skill in the art that the design topologies, including for example, the electrical requirements, the three dimensional space requirements, and the weight bearing requirements for each of these prior art welding machine support units as supplied and configured by two different known commercial manufacturers A and B, may be distinct and mutually incompatible in one or more of these requirements. In a similar way, it will be apparent to those of ordinary skill in the art that the design topologies of the second prior art welding machine support unit 2000 may be substantially divergent in electrical, dimensional, and weight bearing requirements, even though supplied and configured by known commercial manufacturer A to support six pack welding machines. Moreover, welding machine support units intended to support two pack, four pack, six pack, eight pack, or larger welding machine groupings may not be interoperable between the various sizes, electrical capacities, and weight bearing capacities available from a variety of commercial welding equipment manufacturers. It would be desirable to employ an interoperable power distribution apparatus and systems which may be safely configured for operability across various welding machine types, sizes, dimensions, and capacities, as well as associated arrays of welding machine support units produced by many different manufacturers of welding equipment.

FIG. 1 shows a perspective view of a plurality of interoperable power distribution base units including a first interoperable power distribution base unit 100, a second interoperable power distribution base unit 110, a third interoperable power distribution base unit 120, a fourth interoperable power distribution base unit 130, and further additional power distribution base units N, where N is a positive natural number between 1 and 100. As shown in FIG. 1, each of the plurality of interoperable power distribution base units labeled 100, 110, 120, 130, . . . . N are arranged in a first configuration wherein said plurality of interoperable power distribution base units are sequentially arranged along at least a first dimension, such as a first vertical or Y dimension. A plurality of fastening regions 105, 115, 125, etc. are included at least along a portion of opposing ends of the plurality of interoperable power distribution base units 100, 110, 120, 130, . . . . N, such that opposing pairs of said plurality of fastening regions 105, 115, 125, etc. are arranged along a second dimension, such as a second horizontal or X dimension as viewed from one perspective, and adjacent pairs of said plurality of fastening regions 105, 115, 125, etc. are further arranged along the first vertical or Y dimension, when viewed from another perspective. The plurality of fastening regions 105, 115, 125, etc. may include various combinations of components selected from the group consisting of apertures, pins, screws, bolts, clamps, nuts, washers and other connectors as are known in the art, and may further include male and female mating and various thread patterns to allow rapid, sufficiently rigid, and structurally sound interconnections and disconnection of attached components such as the plurality of interoperable power distribution base units 100, 110, 120, 130, . . . . N. When the plurality of interoperable power distribution base units 100, 110, 120, 130, . . . . N are arranged and interconnected along the plurality of fastening regions 105, 115, 125, etc. as shown in the first configuration depicted in FIG. 1, said plurality of interoperable power distribution base units 100, 110, 120, 130, . . . . N are thus removably attached in the first configuration for convenient storage, shipping, or staging at a work site.

Figure 2:
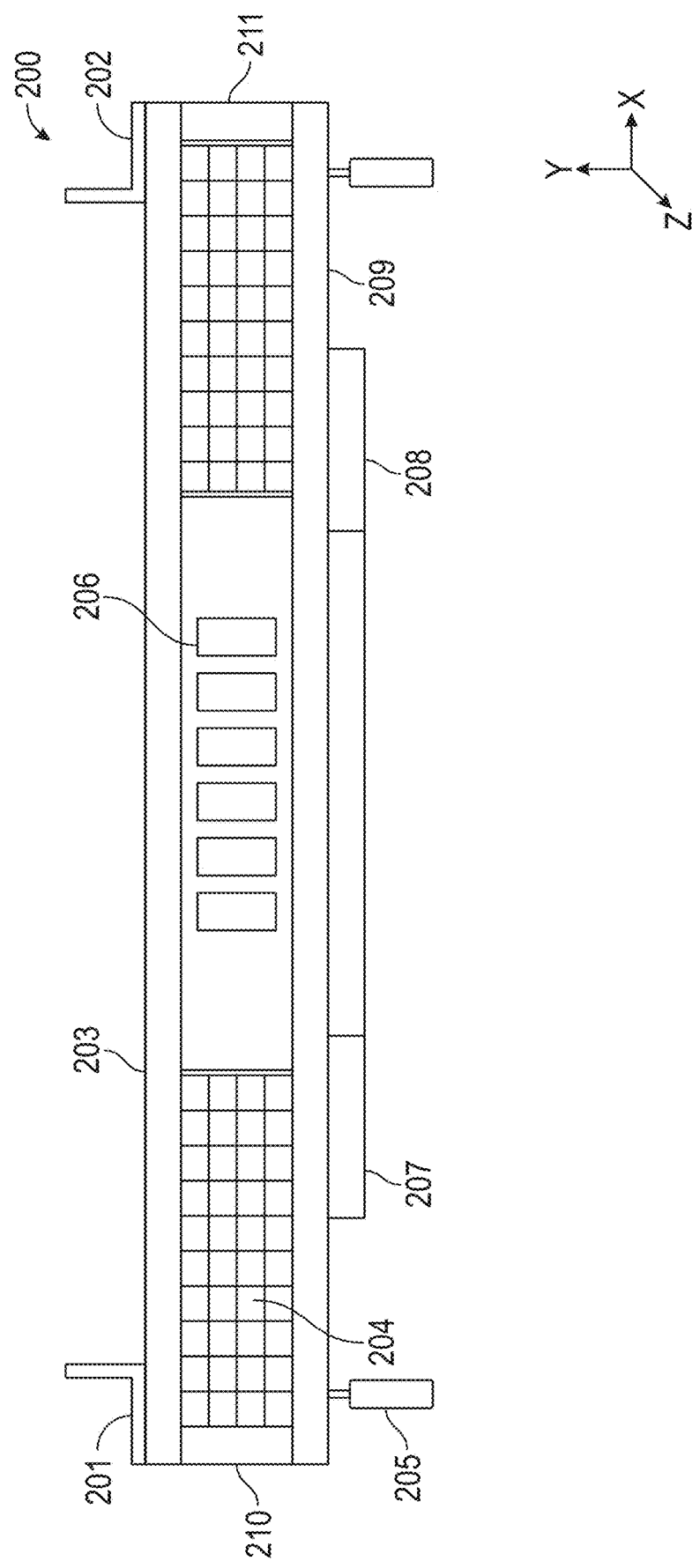
FIG. 2 is a perspective view of a power distribution base unit in accordance with an exemplary embodiment of the present invention.

FIG. 2 is a perspective view of a power distribution base unit 200 in accordance with an exemplary embodiment of the present invention. The exemplary power distribution base unit 200 may be used as any one of the plurality of interoperable power distribution base units 100, 110, 120, 130, . . . . N. The power distribution base unit 200 includes an upper horizontal planar surface 203 extending along an X axis and Z axis directions upon which a plurality of repositionable support brackets 201 and 202 as shown are mounted along opposing edges of the upper horizontal planar surface 203, said plurality of repositionable support brackets 201 and 202 extend in part along orthogonal X, Y, and Z axis directions. Moreover, the plurality of repositionable support brackets 201 and 202 are securely and also removably attached to the upper horizontal planar surface 203 of the power distribution base unit 200 using various combinations of connection components consisting of apertures, pins, screws, bolts, clamps, nuts, washers and other connectors as are known in the art and may further include male and female mating and various thread patterns. The removeable attachment of the plurality of repositionable support brackets 201 and 202 allows the plurality of repositionable support brackets 201 and 202 to be positioned, moved, and then securely repositioned by loosening, removing, and/or reattaching the various combinations of connection components for moveability and positioning in a positive or negative X axis directions along the upper horizontal planar surface 203 of the power distribution base unit 200. As such, the plurality of repositionable support brackets 201 and 202 may be positioned and then secured to accommodate the base dimensions and weight bearing capacities of welding machine support units (e.g., 1000-4000 in FIG. 10) constructed with equal or unequal external first, second, or third orthogonal dimensions by adjusting the distances between the repositionable support brackets 201 and 202 to allow secure attachment via the connection components to welding machine support units produced by many different manufacturers of welding equipment. The power distribution base unit 200 is thus an interoperable power distribution apparatus which forms a part of an interoperable power distribution system which may be safely configured for operability across various welding machine types, sizes, dimensions, and capacities, as well as associated arrays of welding machine support units produced by many different manufacturers of welding equipment, said interoperability including at least mechanical interoperability and electrical interoperability, as further explained below.

Referring again to FIG. 2, the power distribution base unit 200 further includes screen portions 204, for example steel screens which may be formed as a grille to allow for easy visual identification of tools and accessories, as well as for proper ventilation and safe usage of high-powered welding equipment in close proximity which may operate at increased temperatures. The power distribution base unit 200 further includes a plurality of casters, rollers, or wheels 205 which are constructed for sufficient weight bearing capacity to provide rolling mobility for the power distribution base unit 200 even when loaded with numerous welding machines (e.g., two pack, four pack, six pack, eight pack, etc.) installed on welding machine support units (e.g., 1000-4000 in FIG. 10). A plurality of electrical receptacles 206 are mounted on a face of the power distribution base unit 200 for convenient electrical connections as needed for electrical energy supply to power tools and other electrically powered devices. As the power distribution base unit 200 is designed with high weight bearing capacity to support welding machines packed onto welding machine support units, fork lift prong pockets 207 and 208 are installed along a lower horizontal planar surface 209 extending along an X axis and Z axis directions to allow the power distribution base unit 200 to be safely lifted by insertion of fork lift prongs below the lower horizontal planar surface 209 of the power distribution base unit 200 such that the entire stacked structure including welding machines, welding machine support units, and the power distribution base unit 200 may be raised by a fork lift operator. Moreover, opposing end face surfaces 210 and 211 of the power distribution base unit 200 may include a plurality of fastening regions which may be used for secure and removable attachment of a plurality of power distribution base units 200 via combinations of various connector components as described above, when said plurality of power distribution base units 200 are arranged end to end along a second horizontal or X dimension.

Figure 2A:
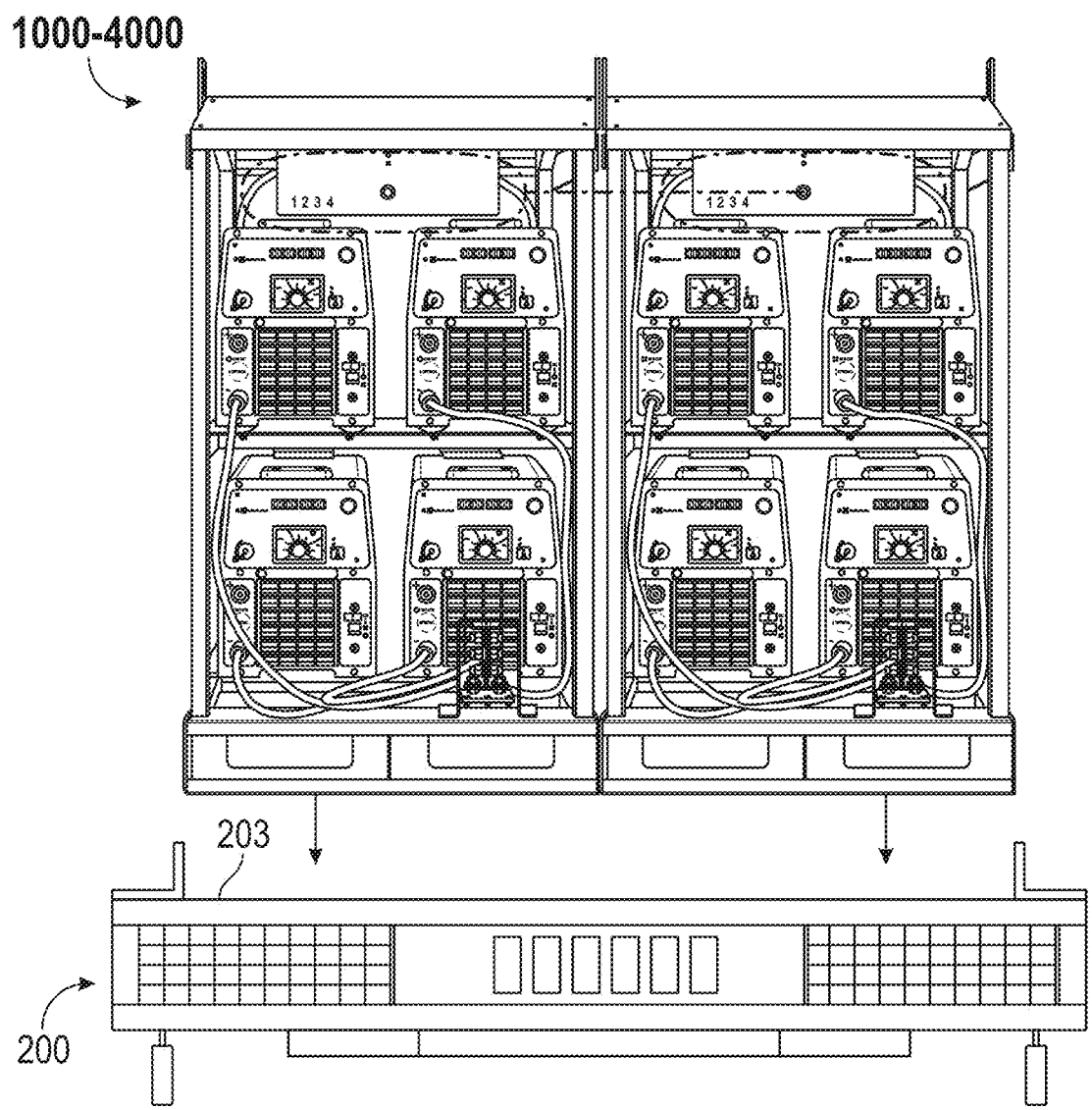
FIG. 2A is a perspective view of a power distribution base unit in a second configuration in accordance with an exemplary embodiment of the present invention.
Figure 2B:
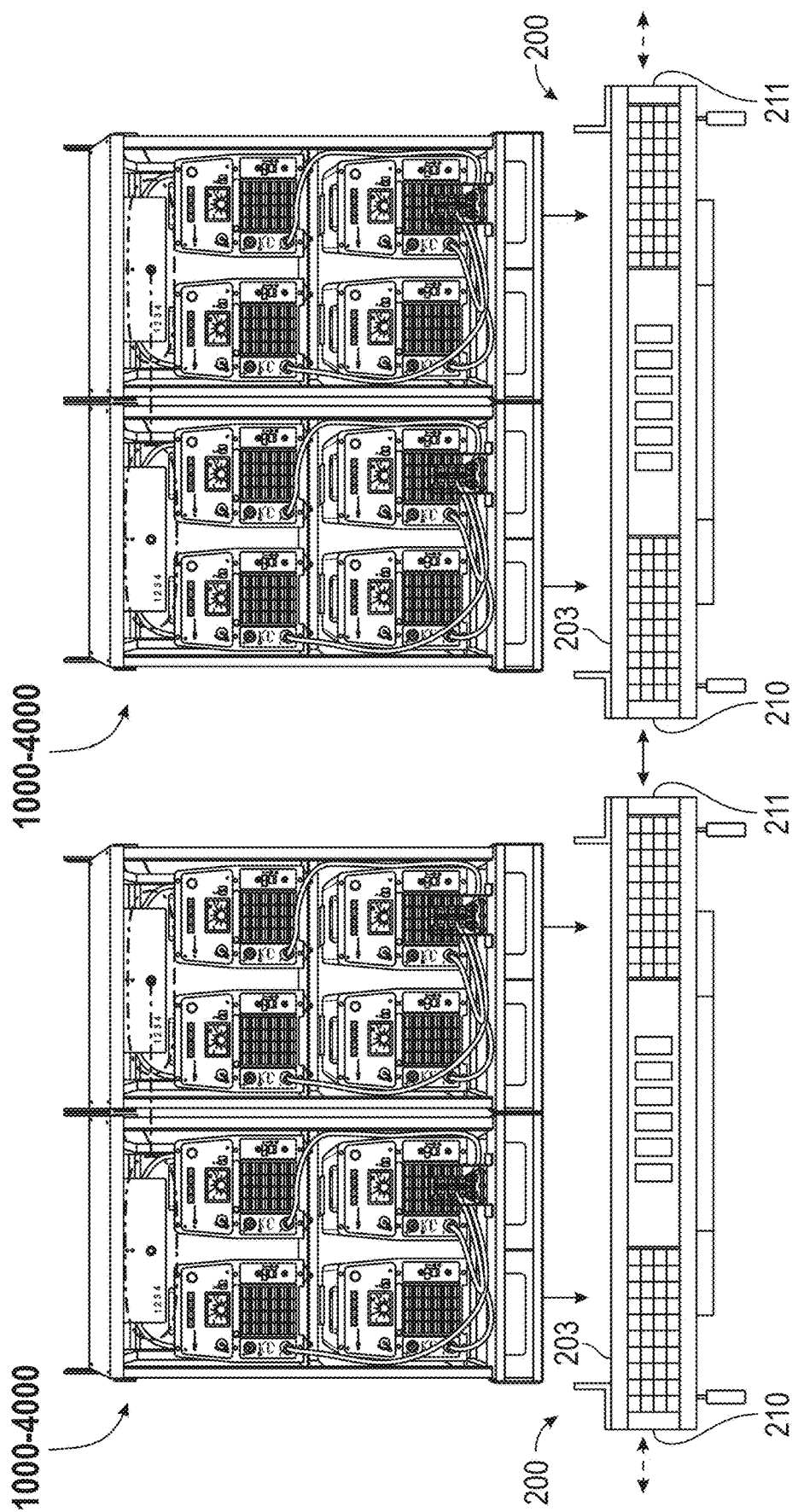
FIG. 2B is a perspective view of a plurality of power distribution base units in a second configuration in accordance with an exemplary embodiment of the present invention.

FIGS. 2A and 2B show perspective views of a power distribution base unit 200 and a plurality of power distribution base units 200, respectively, wherein said power distribution base units 200 are arranged according to a second configuration in accordance with an exemplary embodiment of the present invention. In said second configuration as shown in the exemplary embodiments of FIGS. 2A and 2B, one, two or any number N (where N is a positive natural number between 1 and 100) of power distribution base units 200 are independently and removably attached along at least an upper horizontal planar surface 203 of the respective power distribution base unit 200 to a respective one of N conventional welding machine support units, such as 1000-4000 in FIG. 10. Although attachment along an upper horizontal surface of the power distribution base unit 200 to a respective one of N conventional welding machine support units 1000-4000 is illustrated in exemplary embodiments as shown in FIGS. 2A and 2B, the attachment surfaces of said power distribution base unit 200 and said respective one of N conventional welding machine support units 1000-4000 may be along any appropriate mate able surfaces including at least respective front, back, top, bottom, or any left side or right side mount surfaces, wherein different attachment surface selections allow maximum flexibility in variable configurations which are adaptable as needed to suit particular installation requirements, available clearance space, weight balancing limitations, etc. to achieve broad interoperability as needed for specific applications. Each of the N welding machine support units 1000-4000 may support arrays of two pack, four pack, six pack, eight pack or more welding machines which may be produced by many different manufacturers of welding equipment, thus supporting various prior art welding machine types, sizes, dimensions, and capacities. Therefore when arranged according to the second configuration, the one or plurality of power distribution base units 200 are independently and removably attached to a respective one of N conventional welding machine support units each of which welding machine support units have varied equal or unequal external first, second, or third orthogonal dimensions according to their respective manufacturers design requirements for each specific welding machine array type and size, wherein said N power distribution base units 200 are thus at least mechanically interoperable and removably attachable between said N conventional welding machine support units having equal or unequal external first, second, or orthogonal third dimensions, when N is a positive natural number between 1 and 100. When the interoperable power distribution apparatus is arranged in this second configuration, workers may removably attach N conventional welding machine support units supporting various prior art welding machine arrays, types, sizes, dimensions, and capacities from many different manufacturers of welding equipment into an integrated interoperable power distribution system which permits safe, cost-effective combinations of desired sizes and choice of manufacturers for optimal selections of welding machines installed on welding machine support units as most appropriate for particular projects and tasks. The interoperable power distribution apparatus and system thus eliminates incompatibilities between differing manufacturers of welding machines and welding machines supports.

Figure 3:
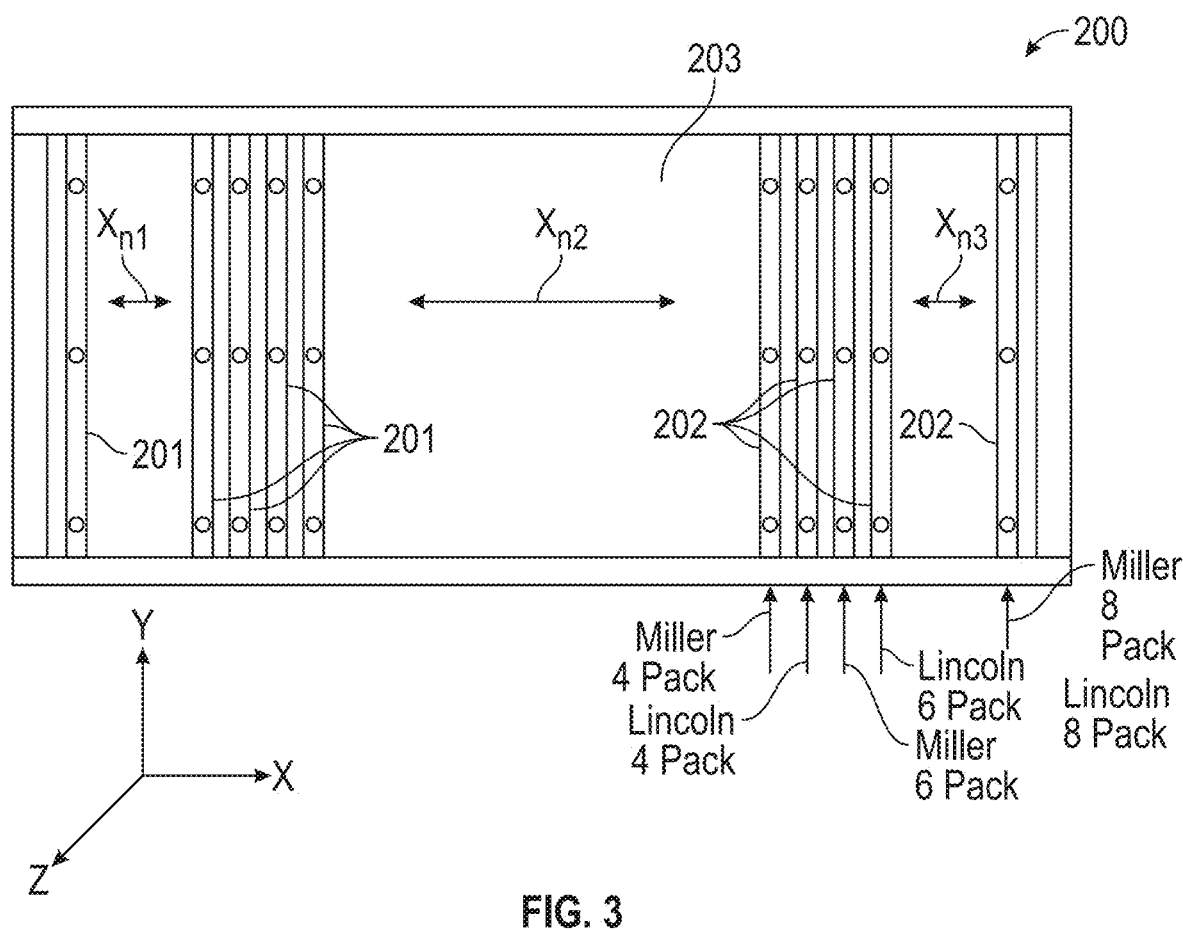
FIG. 3 is a top view of the power distribution base unit shown in FIG. 2 in accordance with an embodiment of the present invention.

FIG. 3 is a top view of the power distribution base unit 200 shown in FIG. 2 in greater detail in accordance with an embodiment of the present invention. FIG. 3 shows an upper horizontal planar surface 203 of the power distribution base unit 200 upon which a plurality of repositionable support brackets 201 and 202 are movably mounted.

Figure 4:
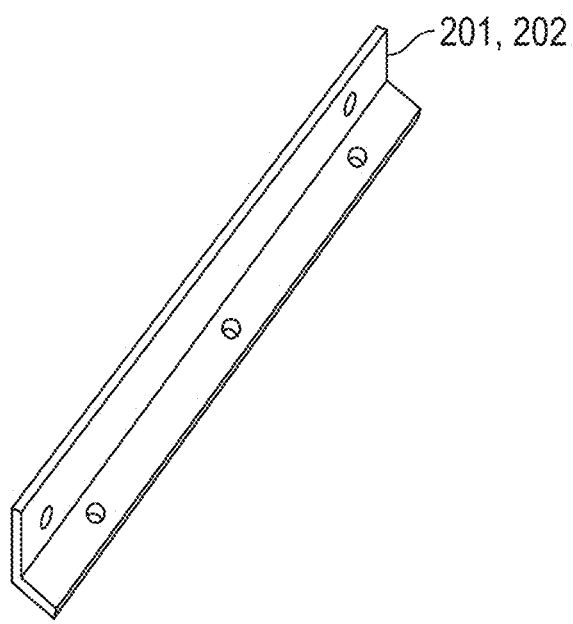
FIG. 4 is a perspective view of a repositionable support bracket for a power distribution base unit in accordance with an embodiment of the present invention.

FIG. 4 shows exemplary repositionable support brackets 201 and/or 202 in greater detail. In one embodiment, the repositionable support brackets 201 and/or 202 each comprise an elongated structural metal beam having an "L-shaped" cross sectional area. In other embodiments the repositionable support brackets 201 and/or 202 may have any polygonal cross-sectional area including but not limited to square, rectangular, triangular, pentagonal, or moreover circular or elliptical cross-sectional areas. Particular cross-sectional areas of the repositionable support brackets 201 and/or 202 may be selected as appropriate to facilitate secure fastening of one or more of the interconnecting structure surfaces. As depicted in FIG. 4, the repositionable support brackets 201 and/or 202 further comprise one or more apertures along at least one face, said apertures may receive removable connecting components such as bolts, screws or pins during removable attachment to the power distribution base unit 200, the welding machine support units and/or other structures. It should be understood that the illustrated lengths and aperture numbers and locations are merely exemplary of one of several possible positions useful to facilitate removable component attachments.

Returning to FIG. 3, a plurality of repositionable support brackets 201 are movably mounted and in the example arrangement depicted, are in parallel independently adjustable spaced positioning towards a proximal end (for example a left end) of the upper horizontal planar surface 203. Additionally, a plurality of repositionable support brackets 202 are movably mounted in the example arrangement depicted and are in parallel independently adjustable spaced positioning towards a distal end (for example a right end) of the upper horizontal planar surface 203. As further shown in FIG. 3, the repositionable support brackets 201, 202 are adjustably spaced along an X axis at independently selected displacements Xn1, Xn2, Xn3, . . . . Xn, etc. where Xn is any decimal or fractional number indicating a distance along an X axis. Therefore, each of the numbers Xn represent a current "gap distance" between adjacent repositionable support brackets 201 and/or 202.

In operation, the gap distances Xn are selected to correspond to at least one external dimension of at least one surface of a welding machine support unit such that the selected gap distances position the repositionable support brackets 201 and/or 202 securely around a perimeter of any surface, for example a bottom surface of a welding machine support unit. As explained elsewhere herein, each different manufacturer of welding equipment and each type and size of welding machine array may have unique dimensions, shapes, and structural requirements for the various welding equipment products, including welding machine support units. By judicious selection of gap distances Xn between the repositionable support brackets 201 and/or 202, each of the power distribution base units 200 may be configured to accommodate any type of welding machine support unit, regardless of manufacturer. Once the gap distances Xn between the repositionable support brackets 201 and/or 202 are properly set as dimensionally appropriate for a particular manufacturers welding machine support units, the repositionable support brackets 201 and 202 are secured in place along the upper horizontal planar surface 203 of the power distribution base units 200 using combinations of connecting components selected from apertures, pins, screws, bolts, clamps, nuts, washers and other connectors as are known in the art to allow rapid, rigid, and structurally sound interconnections between the upper planar surface 203 of each power distribution base units 200 and a bottom surface of a welding machine support unit, such as the various array packs, types, sizes and manufacturers welding machine support units 1000-4000 (see for example in FIG. 10). As discussed elsewhere herein, the mating surfaces illustrated and described as top, bottom, etc. are inclusive of any appropriate mate able surfaces between the power distribution base units 200 and the various welding machine support units 1000-4000 including at least respective front, back, top, bottom, or any left side or right side mount surfaces. As such, the interconnected power distribution base units 200 and welding machine support units form an interoperable power distribution apparatus and system.

Figure 6:
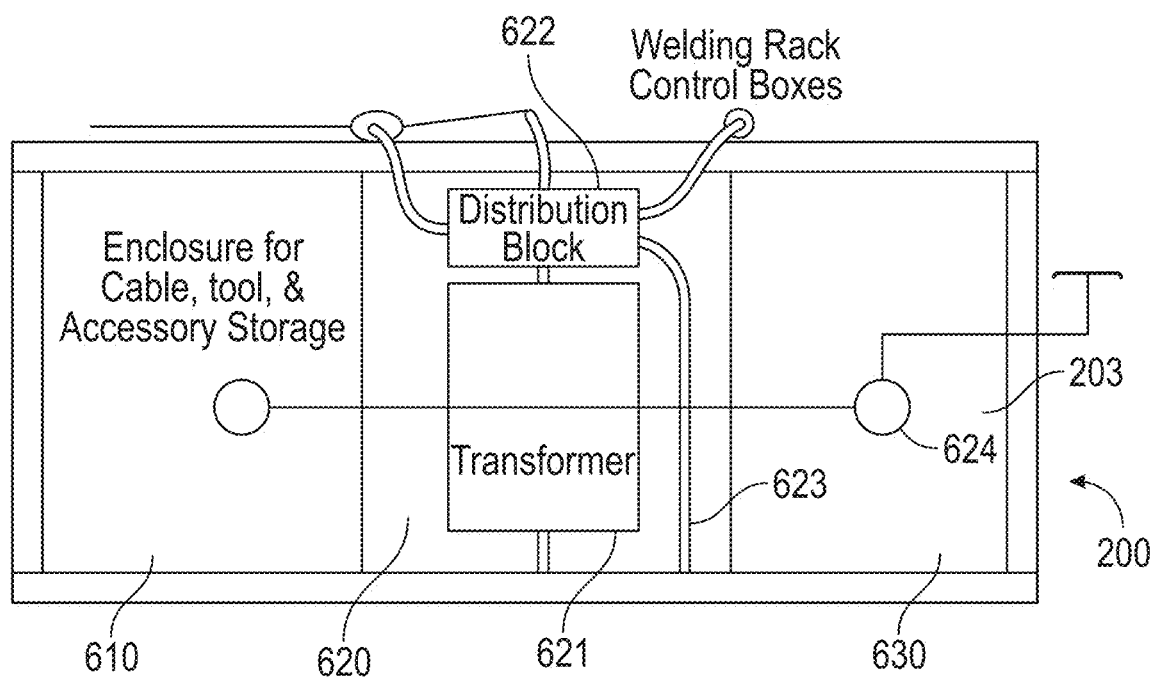
FIG. 6 is another top view of the power distribution base unit shown in FIG. 2 with the repositionable support brackets removed in accordance with an embodiment of the present invention.

FIG. 6 is another top view of the power distribution base unit 200 shown in FIG. 2, in this case having the repositionable support brackets 201 and 202 removed for clarity of explanation and allowing components below the repositionable support brackets 201 and 202 within the power distribution base unit 200 to be viewed. FIG. 6 shows three representative enclosure compartment areas 610, 620, and 630, although more or less compartment areas may be employed. In an exemplary embodiment, a first compartment area 610 may be available for storage of accessories, tools, spare cable, or any other items useable by work crew members at a worksite. A second compartment area 620 includes electrical devices such as at least one transformer 621, at least one power distribution block 622, and various electrical wiring runs 623. A third compartment area 630 may provide additional spare storage or house additional components. Each of the representative compartment areas 610, 620, and 630 may further include penetrations, conduit, or raceways 624 to accommodate, organize, and protect various additional electrical wiring runs 623. Said electrical wiring runs 623 are integrated for electrical interconnections between a plurality of N welding machine units, control boxes, power tools, luminaires, electrical receptacles, or other electrical devices which may be selectively powered using a unified electrical power input.

Still referring to FIG. 6, the at least one transformer 621 is configured to allow for voltage transformations between windings (such as step-up/step-down, increases or decreases) and/or circuit isolation in a manner as is known to those of ordinary skill in the art. The at least one transformer 621 may include primary, secondary and tertiary windings, internal fixed or variable taps having tap changers, as well as relative winding turn ratios which facilitate a wide range of voltage conversions as needed by welding machines which are produced by different manufacturers, for use with electrical supply nominal voltages available in different countries around the world, and for different types of welding machine array packs arranged in series or parallel configurations. The at least one power distribution block 622 receives and distributes the various power voltage levels and further provides a plurality of electrical connectivity points between the at least one transformer 621 and the load devices being serviced. The at least one power distribution block 622 may additionally provide wired or wireless interconnections between other circuits such as, for example, communications circuits and safety monitoring circuits, whether locally or for remote monitoring. Although not shown in the figure, other power conditioning components may be included within the at least one power distribution block 622 or electrically interconnected and physically external to it. Examples of other power conditioning components include voltage regulation and smoothing systems, voltage conversion systems (including AC/DC conversions), wave shaping systems which optimize waveforms within a power cycle feeding specific loads, spike and lightning suppression systems, backup power systems, current inrush limiters, computer controlled and programmable systems, and other protective systems which may be controlled by artificial intelligence and are known in the art. Therefore, the instant power distribution apparatus and system is also electrically interoperable in view of the foregoing electrical adaptability between welding machines and equipment which are produced by different manufacturers and designed for operation at the nominal supply voltages available in different countries around the world regardless of specific type, voltage, current and power requirements which are indicated by the manufacturers of welding machine array packs.

Figure 7:
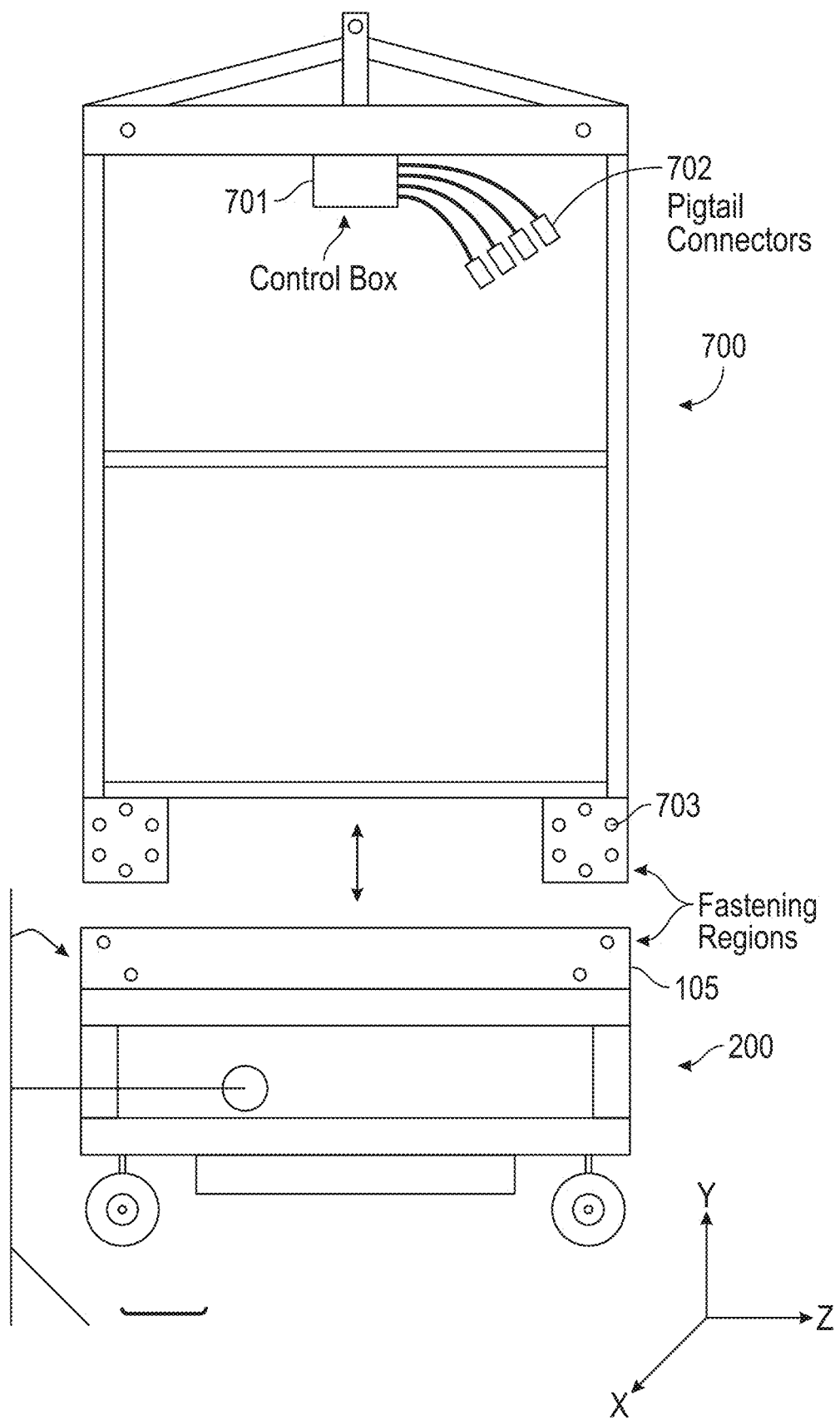
FIG. 7 is a side view of a welding machine support unit frame attachable to a power distribution base unit in a second configuration in accordance with an exemplary alternate embodiment of the present invention.

FIG. 7 shows a side view of a welding machine support unit frame 700 which is attachable to a power distribution base unit 200 in a second configuration in accordance with an exemplary alternate embodiment of the present invention. FIG. 7 shows a welding machine support unit frame 700 which is particularly adapted for interoperability when connected to a power distribution base unit 200 to form an alternate embodiment of an interoperable power distribution system. The welding machine support unit frame 700 supports welding machines produced by various manufacturers and includes at least the following aspects: First, the welding machine support unit 700 frame structure includes a plurality of fastening regions 703 arranged along a lower portion of the frame. The plurality of fastening regions 703 are positioned for mating engagement with another set of a plurality of fastening regions 105 which are positioned along a portion, in one example an upper portion of a power distribution base unit 200. Said mating engagement may be achieved using removably attached combinations of connecting components such as apertures, pins, screws, bolts, clamps, nuts, washers and other connectors as are known in the art. Notably, the plurality of fastening regions 703 are likewise positioned to allow for mating engagement with another set of a plurality of fastening regions 703 which are positioned along a lower portion of a second welding machine support unit frame 700 which may be positioned, for example, adjacent and left of the center welding machine support unit 700 frame, as well as a third welding machine support unit frame 700 which may be positioned, for example, adjacent and right of the center welding machine support unit 700 frame. In this embodiment, each of welding machine support unit frames 700 may be mechanically connected along an X axis using removably attachable combinations of connecting components such as apertures, pins, screws, bolts, clamps, nuts, washers and other connectors as are known in the art, and each may be similarly mechanically connected along a Y axis to a corresponding power distribution base unit 200 positioned below each of the respective welding machine support unit frames 700 for removably attachable mechanical connections of sufficient rigidity to allow full weight bearing capacity of large arrays of various welding machine support unit frames integrated along the X and Y axes to create customizable arrays of structurally, interconnected, yet fully disconnectable components suitable for any size welding projects, allowing for well-organized and simultaneous use of a great number of welding machines which may be safely stacked and integrated into a unified super system.

Second, referring again to FIG. 7, the welding machine support unit 700 frame structure includes a control box 701. The welding machine support unit 700 frame structure may further include a plurality of pigtail type connectors 702. The welding machine support unit 700 frame structure may still further include one or more remote mounted outlet boxes. The one or more remote mounted outlet boxes comprises an electrical box having electrical receptacles and electrical power output connectors which may removably mounted at various positions and convenient heights along the frame of the welding machine support unit 700 frame structure for universal attachment and temporary or permanent mounting to the welding machine support unit 700 frame structure. The one or more remote mounted outlet boxes may be electrically connected by wiring into a power distribution block, such as for example the at least one power distribution block 622 of the power distribution base unit 200. In one embodiment the one or more remote mounted outlet boxes may be mounted for securement to any one of the elongated beams extending along an X axis, a Y axis, or a Z axis directions of the welding machine support unit 700 frame structure. In another embodiment the one or more remote mounted outlet boxes may be mounted for securement between opposing sets of elongated beams extending along an X axis, a Y axis, or a Z axis directions of the welding machine support unit 700 frame structure. Therefore, the instant welding machine support unit 700 frame structure having a control box 701, a plurality of pigtail type connectors 702 and/or one or more remote mounted outlet boxes facilitates rapid and conveniently positioned electrical connections of each of the electrical devices which may be integrated with the interoperable power distribution system.

Third, referring again to FIG. 7, as the welding machine support unit 700 frame including the plurality of fastening regions 703 and the plurality of pigtail type connectors 702, is constructed for mating engagement with a corresponding power distribution base unit 200, the instant welding machine support unit 700 frame and the power distribution base unit 200 may be manufactured by a single manufacturer in various sizes having coordinated dimensions such that the combined system of FIG. 7 is both mechanically and electrically interoperable as an alternate embodiment of a unified welding system.

Figure 8:
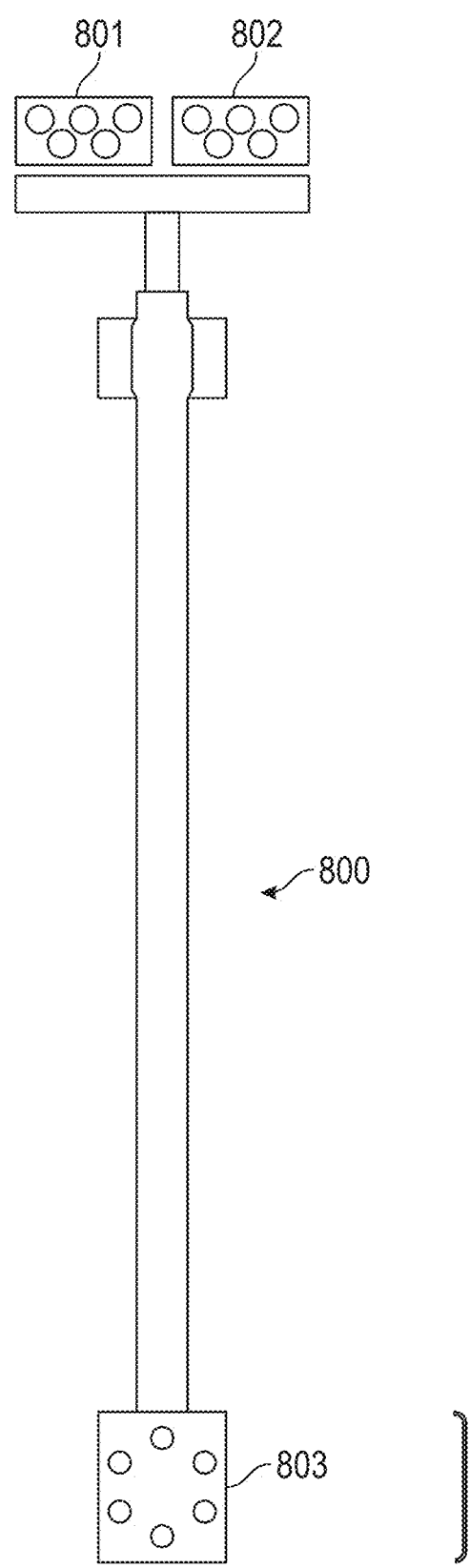
FIG. 8 is a perspective view of a light mast unit in accordance with an embodiment of the present invention.

FIG. 8 shows one example of a light mast unit 800 which may be used along with any of the various welding machine support units and the power distribution base unit embodiments disclosed herein. As used herein, a light mast unit 800 comprises one or a plurality of single and multistage light masts. In one illustrated embodiment as shown in FIG. 8 along a top portion, one or more luminaires 801 and 802 are removably electrically and mechanically connected to a light mast unit 800. As further shown in FIG. 8 along a bottom portion, one or more fastening regions 803 may include combinations of connecting components such as apertures, pins, screws, bolts, clamps, nuts, washers and other connectors as are known in the art which may be used to removably attach said light mast units 800 to power distribution base units 200, or any of the welding machine support units disclosed herein. Although an elongated beam type light mast unit 800 is depicted in the FIG. 8, other types of luminaires such as magnetically attachable canopy lights may also be employed additionally or alternatively.

Figure 9:
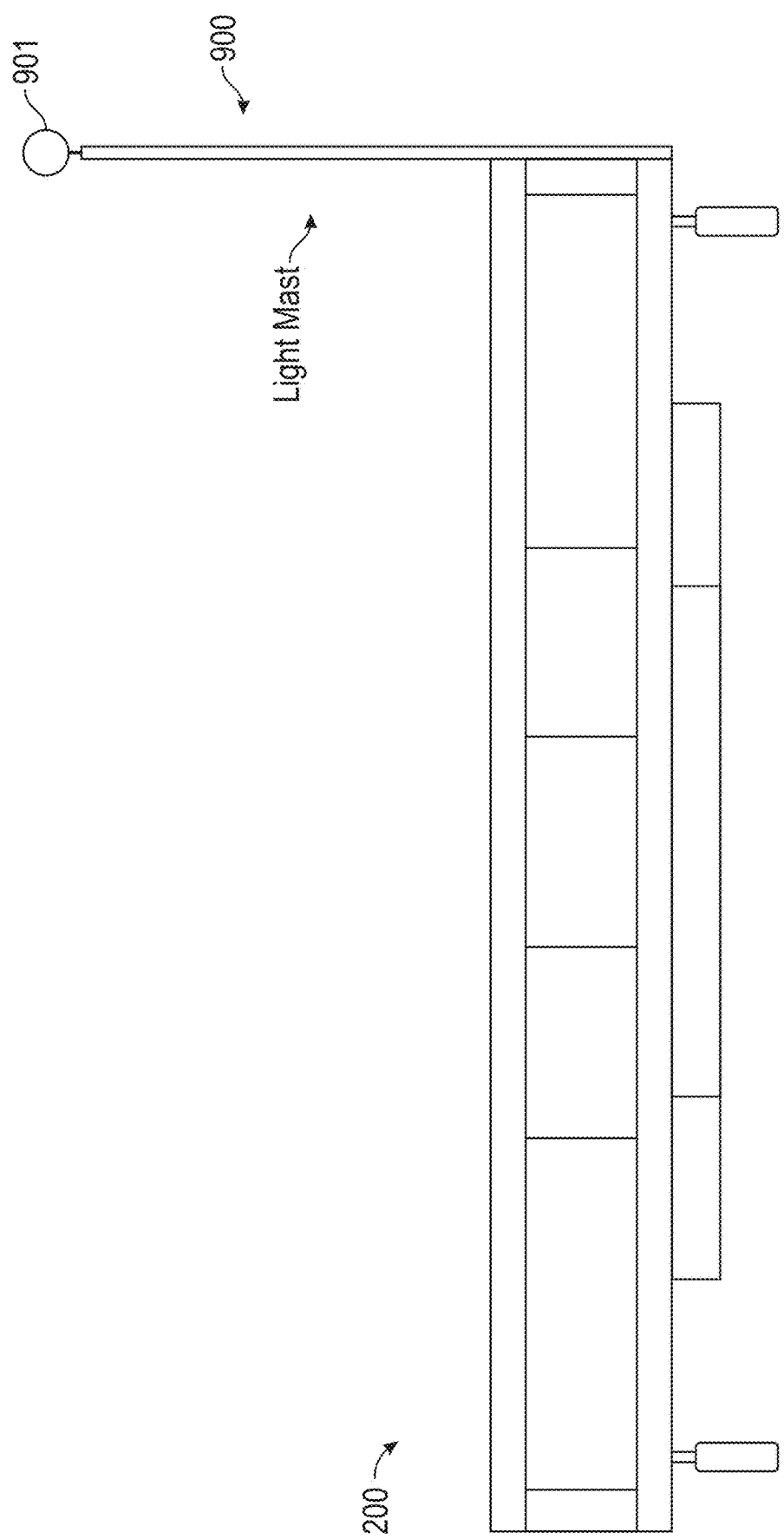
FIG. 9 is a perspective view of another light mast unit attached to a power distribution base unit in accordance with an embodiment of the present invention.

FIG. 9 shows another representative example of yet another type of light mast unit 900 having one or more luminaires 901, which is shown as removably attached along a fastening region (which is similar to those disclosed elsewhere herein) to a power distribution base unit 200 in accordance with an embodiment.

Figure 11:
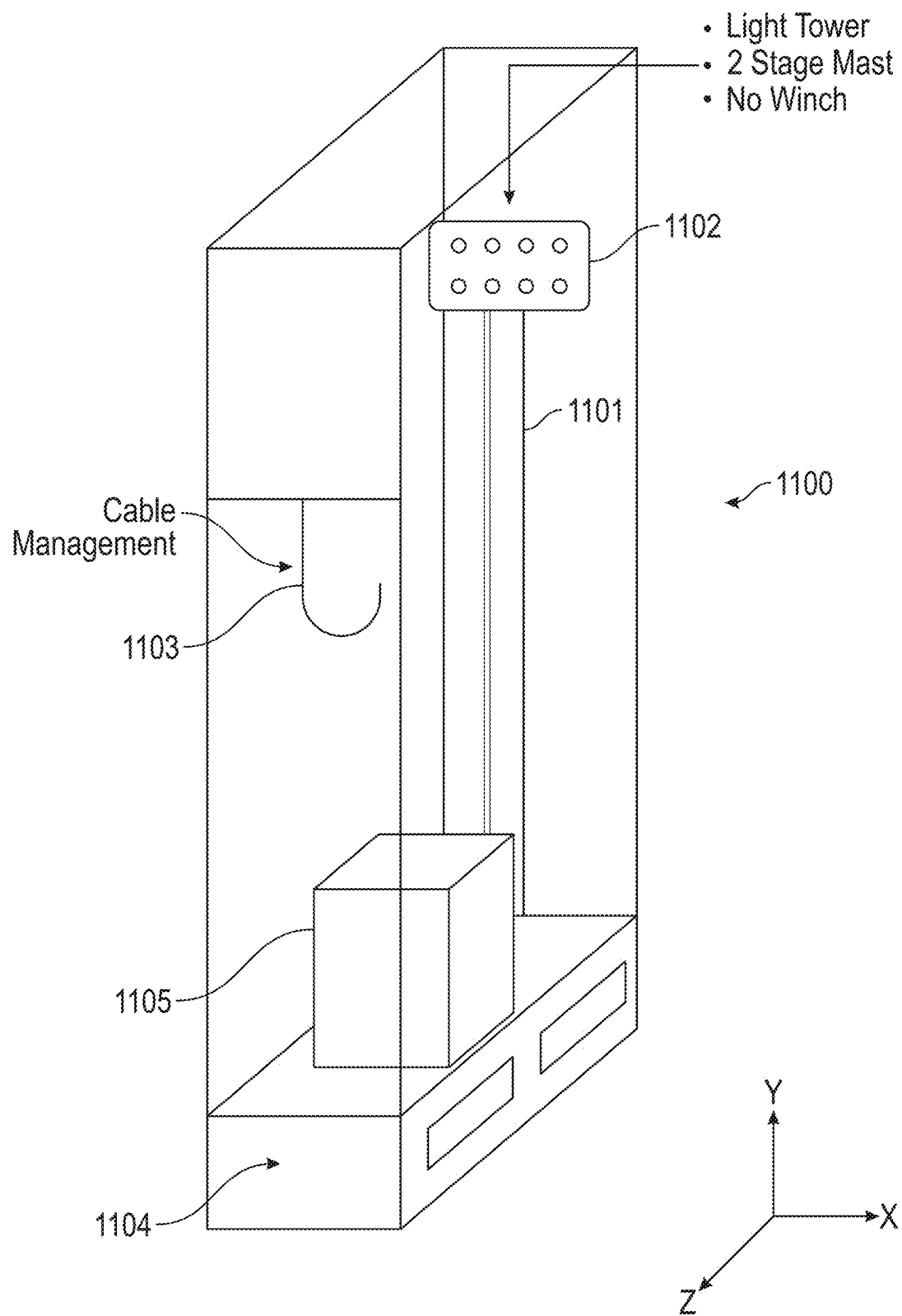
FIG. 11 is a perspective view of a welding machine support unit frame having a third configuration in accordance with an exemplary embodiment of the present invention.

FIG. 11 is a perspective view of a welding machine support unit frame 1100 having a base portion 1104 in a third configuration in accordance with yet another exemplary embodiment. In this embodiment depicted in FIG. 11, the form factor of both the welding machine support unit frame 1100 and the base portion 1104 are elongated or truncated along any of the X, Y, or Z axis dimensions to produce a welding machine support unit having a non-standard form which may support various configurations of welding machines 1105. Moreover, along with the adapted form factor, an upper hook like projection 1103 is used as an alternate cable management component wherein cables may be wrapped around the hook like projection 1103. This embodiment further depicts in FIG. 11 additional luminaires such as the light tower unit 1101 having a two-stage mast and various lamp fixtures 1102. Although no winch is required in the illustrated example of FIG. 11, other embodiments may include a winch where appropriate. The welding machine support unit frame 1100 of this embodiment may be removably attached to power distribution base units 200 described in previous embodiments.

Figure 12:
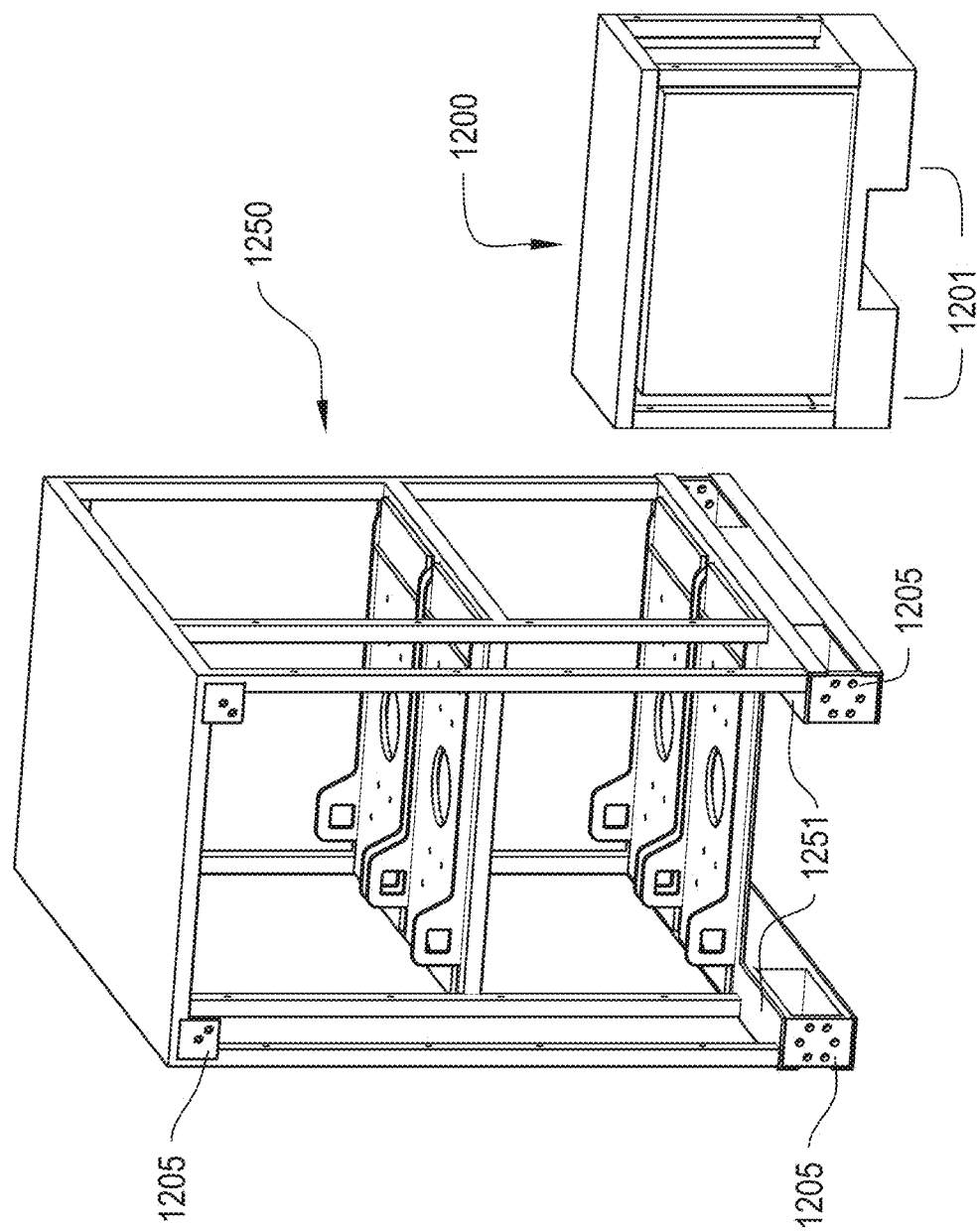
FIG. 12 is a perspective view of a welding machine support unit frame and a power distribution base unit embeddable at least in part within the welding machine support unit frame having a fourth configuration in accordance with an exemplary embodiment of the present invention.

FIG. 12 shows a perspective view of a welding machine support unit frame 1250 and a power distribution base unit 1200 embeddable, at least in part, within the welding machine support unit frame 1250 in accordance with an exemplary embodiment. In this embodiment the base portions 1201 of power distribution base unit 1200 may be inserted into at least a portion of an end cavity of the welding machine support unit frame 1250, such that the base portions 1201 of power distribution base unit 1200 rest at least partially upon the opposing piers 1251 of the welding machine support unit frame 1250. In this way, a power distribution base unit 1200 may be embedded at least in part within an end cavity of the welding machine support unit frame 1250. More generally, the configuration of the power distribution base unit 1200 as shown in FIG. 12 is designed such that the power distribution base units 1200 each comprise a form factor allowing for removable insertion within at least a portion of a perimeter of a frame of one of the welding machine support units 1250. Accordingly, this configuration allows at least one of the power distribution base units 1200 to be partially or fully enclosed within a perimeter of a frame of a respective one of the welding machine support units 1250. Therefore the selected power distribution base unit 1200 form factor facilitates embedding at least one power distribution base unit 1200 at least in part within a respective one of the welding machine support units 1250, and consequently this embedding allows greater interoperability between the power distribution base units 1200 and the welding machine support units 1250 to accommodate removable attachment of the power distribution base units 1200 to a wide variety of types of welding machine support units 1250, including those produced in varying dimensions from numerous different manufacturers to accommodate a range of worksite applications.

In another embodiment, first and second welding machine support unit frames 1250 may be interconnected along the faces of their respective fastening regions 1205 and a power distribution base unit 1200 prepositioned between the first and the second welding machine support unit frames 1250 may thus rest at least partially upon the opposing piers 1251 of the first welding machine support unit frame 1250 and also at least partially upon the opposing piers 1251 of the second welding machine support unit frame 1250, thus simultaneously embedded at least in part within both end cavities of the first and second welding machine support unit frames 1250.

Figure 12A:
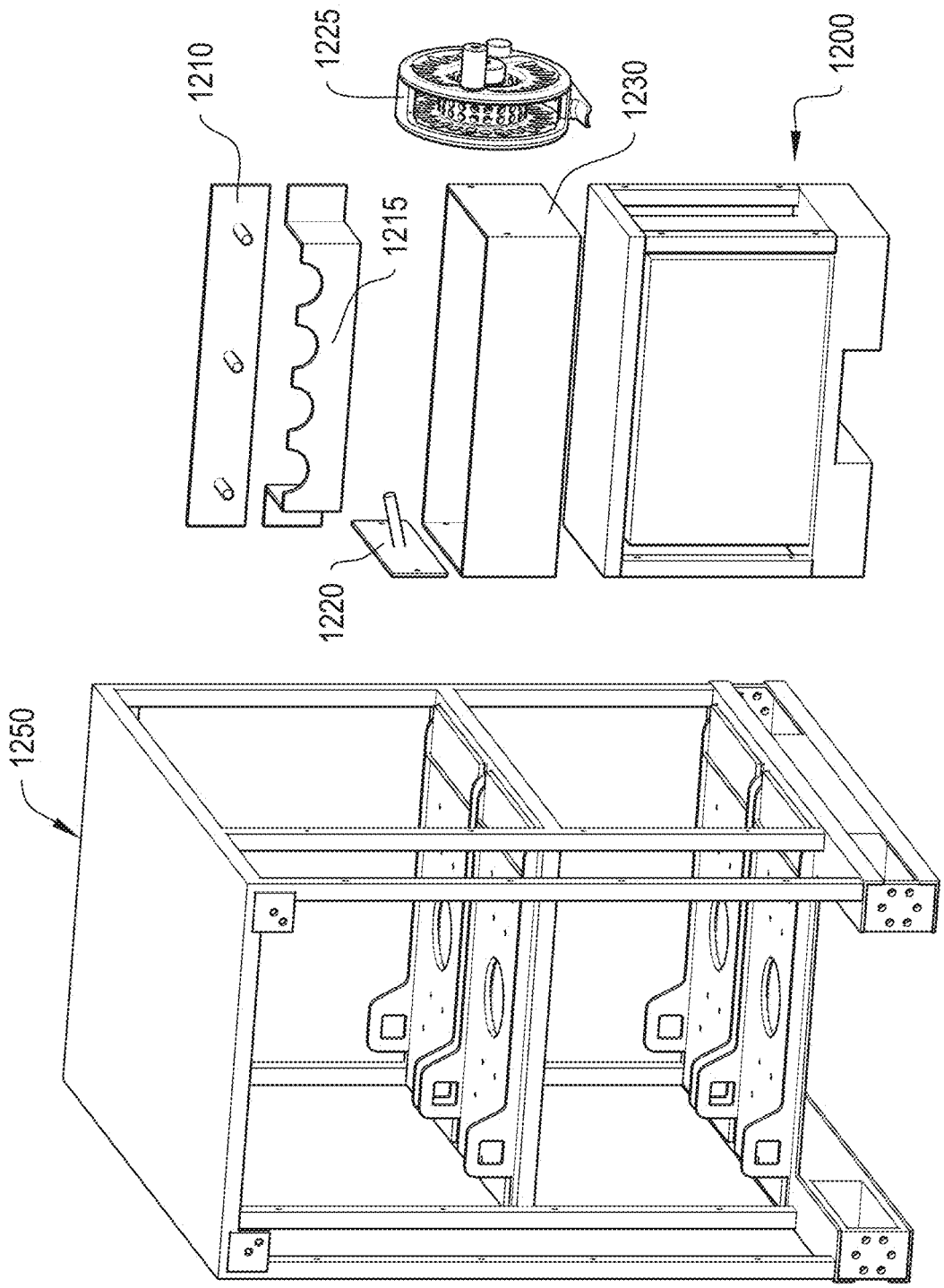
FIG. 12A is a perspective view of a welding machine support unit frame, a power distribution base unit having a fourth configuration, and additional components in accordance with an exemplary embodiment of the present invention.

FIG. 12A shows a perspective view of a welding machine support unit frame 1250 and a power distribution base unit 1200. Moreover FIG. 12A illustrates additional components which may be optionally incorporated prior to shipping or at worksites according to the specific needs of a project. Exemplary components may include types of cord storage components 1210, 1220; drill and grinder storage enclosures 1215; cord reel storage structures 1225; tool storage enclosures 1230, and similar components adapted to facilitate required tasks and convenient storage at worksites.

Figure 12B:
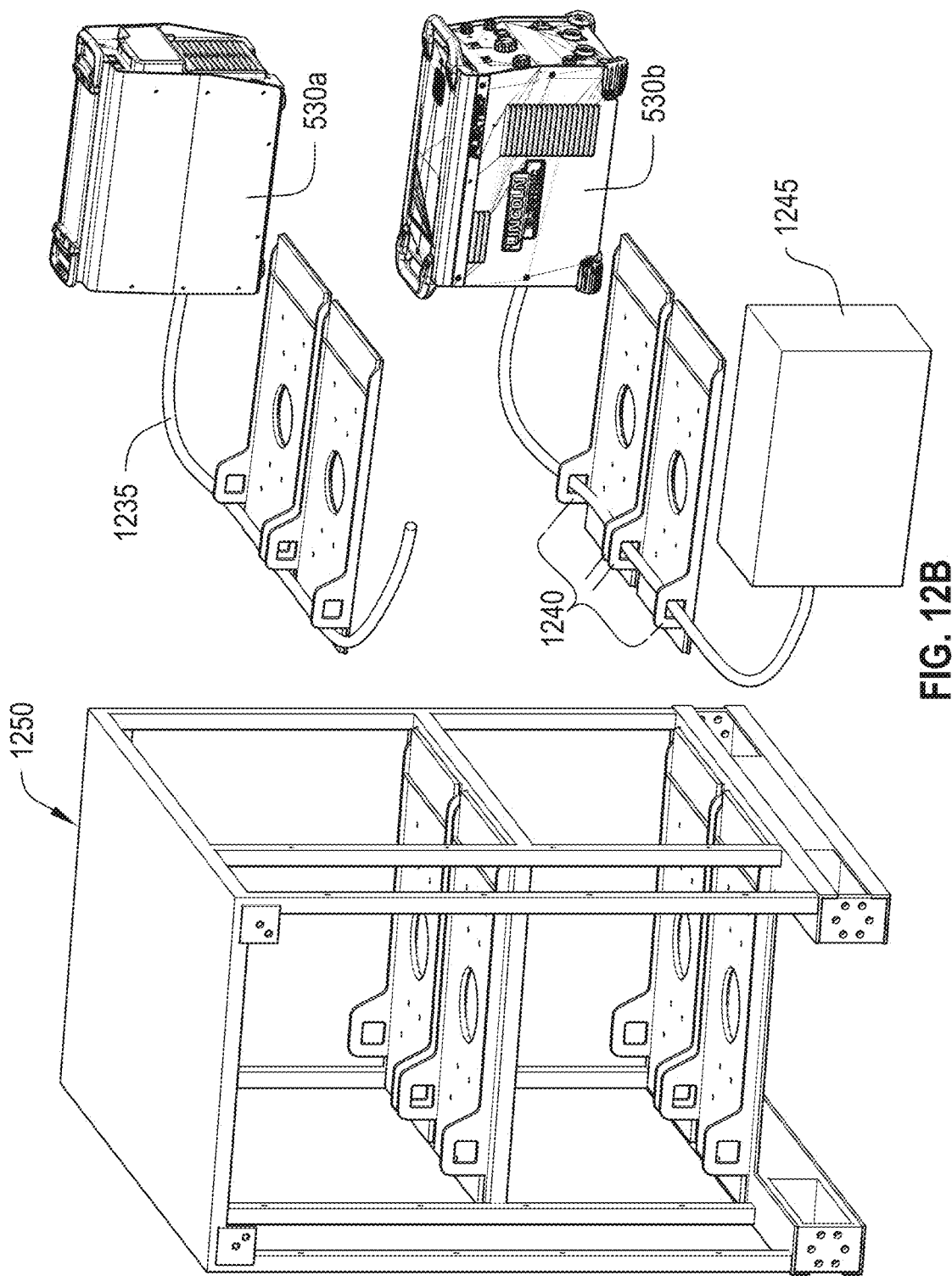
FIG. 12B is a perspective view of a welding machine support unit frame, a power distribution base unit having a fourth configuration, and assembly with additional components in accordance with an exemplary embodiment of the present invention.

FIG. 12B shows a perspective view of a welding machine support unit frame 1250 along with exemplary power cable routing and wiring protection schemes which may be employed between prior art welding machines 530a, 530b and termination points such as power distribution blocks 1245. As shown, power cables 1235 may be routed within, around, or between various power cable routing management and wiring protection features illustrated as arrangements of penetrations, conduits, cable trays, and raceways 1240. Such power cable routing management and wiring protection features provide enhanced safety, durability, and ease of assembly of interoperable power distribution apparatus and systems.

Figure 12C:
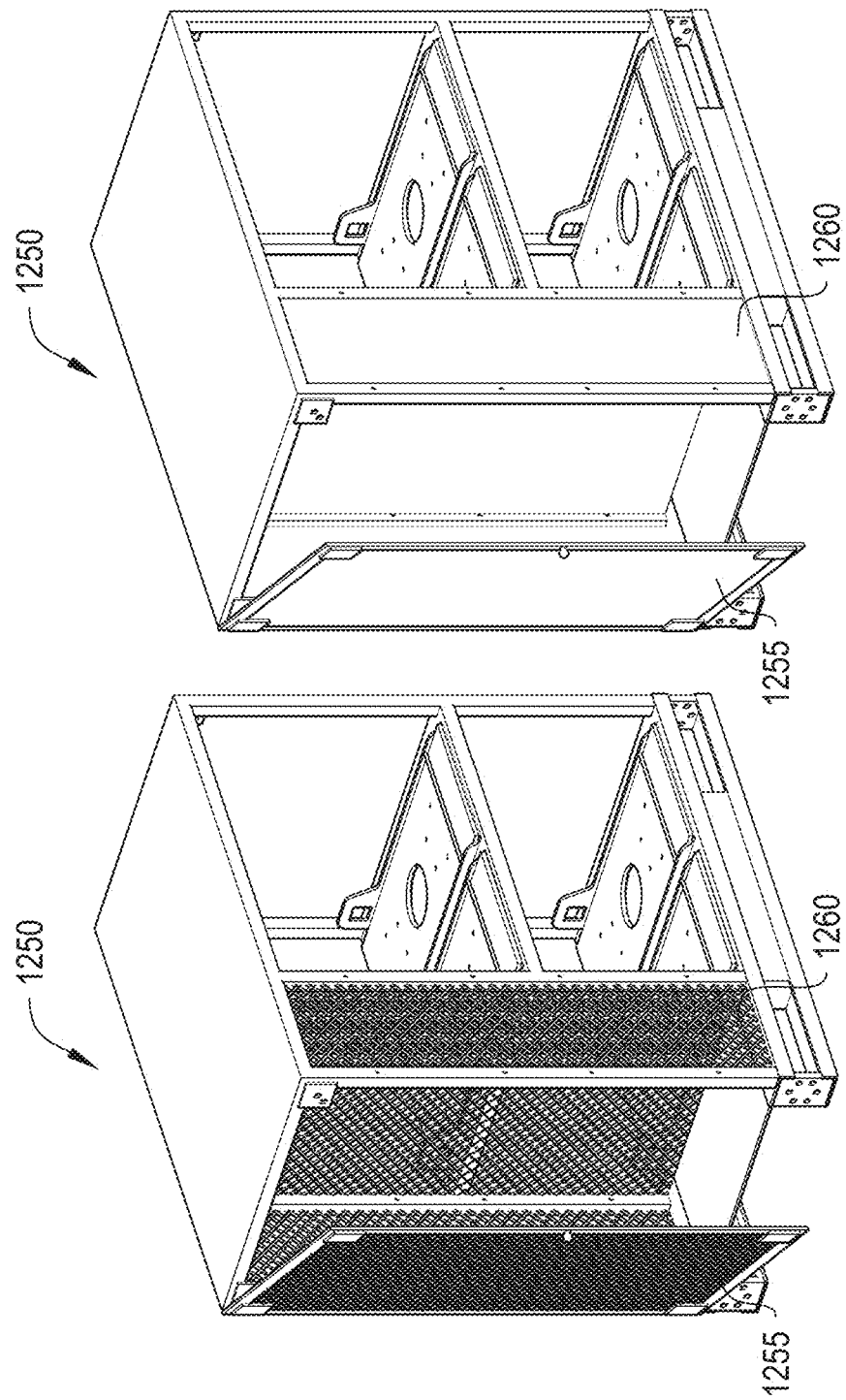
FIG. 12C is a perspective view of a welding machine support unit frame including securement mechanisms having a fourth configuration in accordance with an exemplary embodiment of the present invention.

FIG. 12C shows a perspective view of exemplary welding machine support unit frames 1250 which include securement mechanisms. The various securement mechanisms may include lockable doors or reclosable screens 1255, and/or front panels, back panels, top panels, bottom panels, or side panels 1260 that may enclose one or more cavities of the welding machine support unit frames 1250. These lockable doors 1255, reclosable screens 1255, and/or front panels, back panels, top panels, bottom panels, or side panels 1260 may be constructed of solid materials such as steel or aluminum, or mesh materials such as wires or screens, the latter facilitating viewing and airflow. The various securement mechanisms help prevent theft and can be installed during or after the manufacturing process of the welding machine support unit frames 1250.

Figure 13:
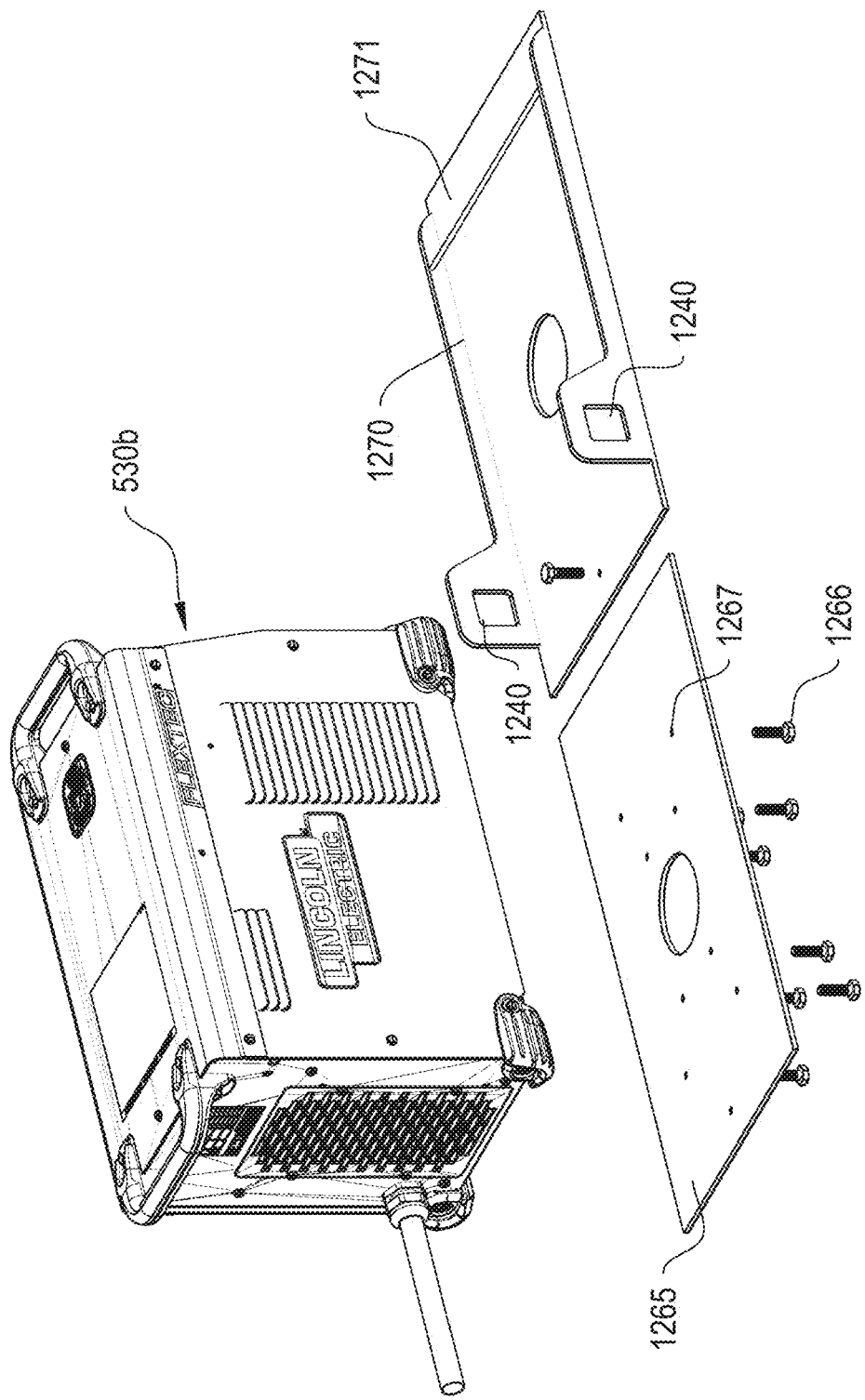
FIG. 13 is an exploded view of a universal welding machine mounting system in accordance with an exemplary embodiment of the present invention.

FIG. 13 is an exploded view of a universal welding machine mounting system in accordance with an exemplary embodiment. The universal welding machine mounting system including a locking plate 1265 that is removably attached to a surface of a welding machine device 530b and a lockable carrier retainer 1270 for slidably receiving the locking plate 1265. When a welding machine device 530b is attached to the locking plate 1265 and is slidably received into the lockable carrier retainer 1270, the welding machine device 530b is securely held in position by the lockable carrier retainer 1270. Additionally, the universal welding machine mounting system allows power cables 1235 of a welding machine device 530b to be routed within, around, or between various power cable routing management and wiring protection features including penetrations, conduits, cable trays, and raceways 1240. Moreover, assembly of the universal welding machine mounting system including the locking plate 1265 that is removably attached to surface of a welding machine device 530b and the lockable carrier retainer 1270 for slidably receiving the locking plate 1265 is facilitated by fastening mechanisms and regions including, for example, components consisting of apertures 1267, and generically depicted pins, screws, bolts, clamps, nuts, washers, spacers, levelers, antifriction feet, friction-limited feet, and anticorrosive materials 1266. Moreover, the lockable carrier retainer 1270 may include additional stabilizing components such as channels, tracks, flanges, trays, lips, slots, pins, bolts, barriers, retention bars 1271, etc. As will be readily understood by those of ordinary skill in the art, all or some of the fastening mechanisms and regions including apertures 1267, and pins, screws, bolts, clamps, nuts, washers, spacers, levelers, antifriction feet, friction-limited feet, anticorrosive materials, as well as the additional stabilizing components such as channels, tracks, flanges, trays, lips, slots, pins, bolts, barriers, retention bars 1271, or their mating male or female equivalents, may each be installed on either side of the locking plate 1265 or the lockable carrier retainer 1270. A frequent problem with welding machine support unit frames 1250 produced by various manufacturers is that they provide limited room between the top of the welding machine devices 530b and bottom of the above shelf or roof of the welding machine support unit frames 1250, thus creating difficulties in placing securement bolts through the bottom of the shelf of the welding machine support unit frames 1250 in order to lock the welding machine devices 530b into position for use. The instant universal welding machine mounting system allows the locking plate 1265 to be bolted 1266 to the bottom of the welding machine devices 530b while it is easily accessible, that is prior to installation within a welding machine support unit frame 1250. Thereafter, a welding machine device 530b with the locking plate 1265 attached may be slidably received into the lockable carrier retainer 1270 and then locked into position. As stated above, the lockable carrier retainer 1270 may also optionally include additional stabilizing components such as channels, tracks, flanges, trays, lips, slots, pins, bolts, barriers, retention bars 1271, etc. In one embodiment, as shown in FIG. 13, a retention bar 1271 which is arranged nearer to the front of the lockable carrier retainer 1270 secures the front portion of the locking plate 1265. The instant universal welding machine mounting system not only facilitates the initial assembly of welding machine devices 530b and welding machine support unit frames 1250, for example at construction jobsites, deters property theft via the locking features, and also allows for easy replacement of failed welding machine devices 530b at the jobsite.

FIGS. 14, 14A-14C show perspective views of welding machine support unit frames and configurations for embedding power distribution base units in accordance with exemplary embodiments.

In the example shown in FIG. 14, a welding machine support unit frame 1450 is adapted to receive an embeddable power distribution base unit 1400 between opposing walls 1425 of the welding machine support unit frame 1450 in accordance with an exemplary embodiment. In this way, the embeddable power distribution base unit 1400 is fully embedded within a respective welding machine support unit 1450, the power distribution base unit 1400 comprising a form factor allowing removable insertion within a center portion of a perimeter of a frame of a welding machine support unit 1450, such that the power distribution base unit 1400 is removably positionable between one or more prior art welding machine devices 530a, 530b, 531a, 531b, etc., such that the power distribution base unit 1400 is fully enclosed within a perimeter of a frame of a respective welding machine support unit 1450, the embedding allowing interoperability between the power distribution base units 1400 and the welding machine support units 1450 to accommodate removable attachment of the power distribution base units 1400 to a variety of types of the welding machine support units 1450.

In the example shown in FIG. 14A, a welding machine support unit frame 1455 is adapted to receive an embeddable power distribution base unit 1410 within a support bracket 1430 of the welding machine support unit frame 1455 in accordance with another exemplary embodiment. In this way, the embeddable power distribution base unit 1410 is fully embedded within a respective welding machine support unit 1455, the power distribution base unit 1410 comprising another form factor allowing removable insertion within a center portion of a perimeter of a frame of a welding machine support unit 1455, such that the power distribution base unit 1410 is removably positionable between, above, or below one or more prior art welding machine devices 530a, 530b, 531a, 531b, etc., such that the power distribution base unit 1410 is fully enclosed within a perimeter of a frame of a respective welding machine support unit 1455, the embedding allowing interoperability between the power distribution base units 1410 and the welding machine support units 1455 to accommodate removable attachment of the power distribution base units 1410 to a variety of types of the welding machine support units 1455.

In the example shown in FIG. 14B, a welding machine support unit frame 1455 is adapted to receive an embeddable power distribution base unit 1410 within the welding machine support unit frame 1455 in accordance with another exemplary embodiment. In this way, the embeddable power distribution base unit 1410 is fully embedded within a respective welding machine support unit 1455, the power distribution base unit 1410 comprising another form factor allowing removable insertion within a center portion of a perimeter of a frame of a welding machine support unit 1455, such that the power distribution base unit 1410 is removably positionable between or above one or more prior art welding machine devices 530a, 530b, 531a, 531b, etc., such that the power distribution base unit 1410 is fully enclosed within a perimeter of a frame of a respective welding machine support unit 1455, the embedding allowing interoperability between the power distribution base units 1410 and the welding machine support units 1455 to accommodate removable attachment of the power distribution base units 1410 to a variety of types of the welding machine support units 1455.

In the example shown in FIG. 14C, a welding machine support unit frame 1455 is adapted to receive an embeddable power distribution base unit 1410 within the welding machine support unit frame 1455 in accordance with another exemplary embodiment. In this way, the embeddable power distribution base unit 1410 is fully embedded within a respective welding machine support unit 1455, the power distribution base unit 1410 comprising another form factor allowing removable insertion within a center portion adjacent to one side of a perimeter of a frame of a welding machine support unit 1455, such that the power distribution base unit 1410 is removably positionable above or along side one or more prior art welding machine devices 530a, 530b, 531a, 531b, etc., such that the power distribution base unit 1410 is fully enclosed within a perimeter of a frame of a respective welding machine support unit 1455, the embedding allowing interoperability between the power distribution base units 1410 and the welding machine support units 1455 to accommodate removable attachment of the power distribution base units 1410 to a variety of types of the welding machine support units 1455.

Figure 15:
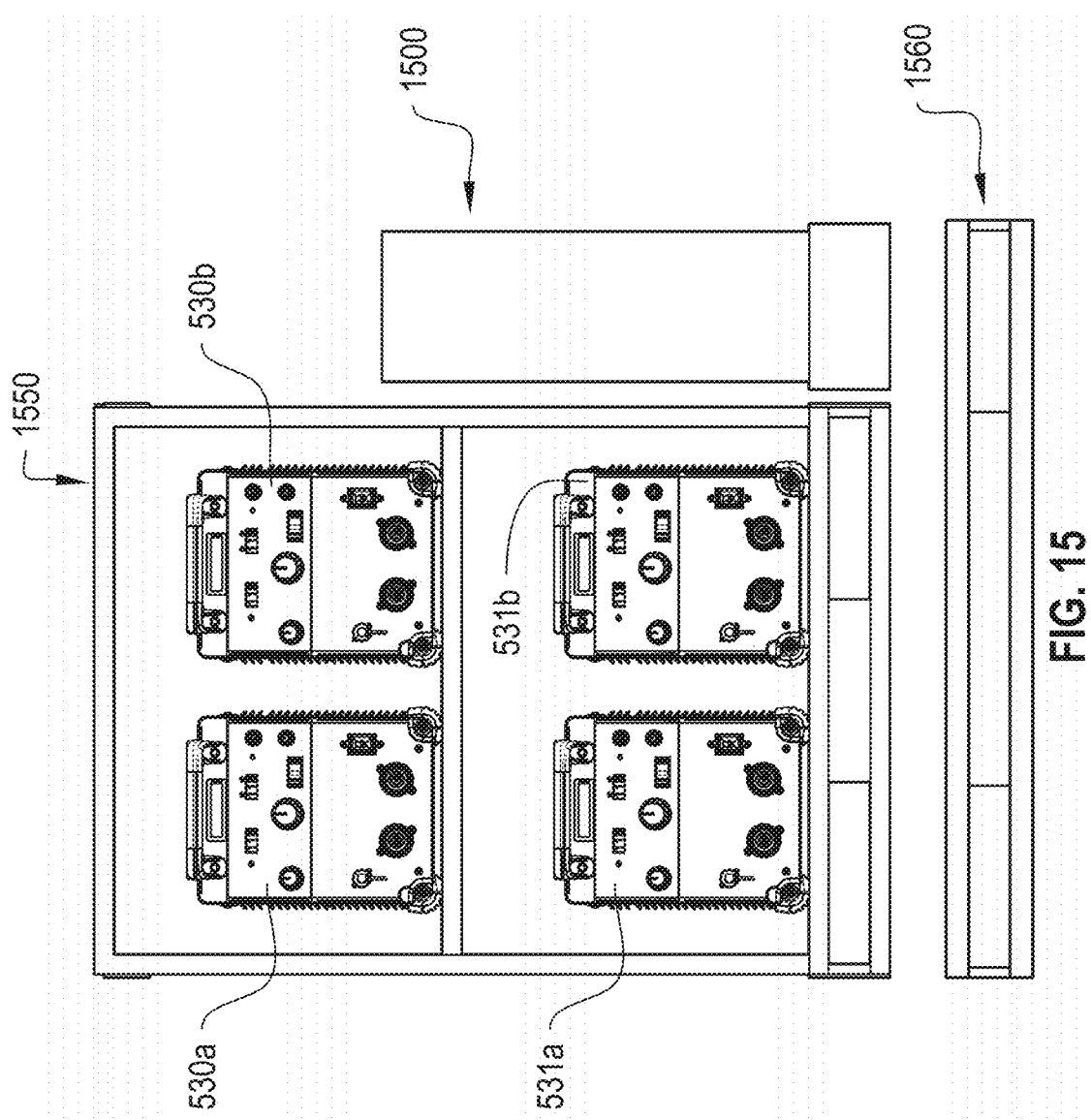
FIG. 15 is a perspective view of a welding machine support unit frame, a power distribution base unit having a fifth configuration, and a universal platform in accordance with an exemplary embodiment of the present invention.

FIG. 15 shows a perspective view of a welding machine support unit frame 1550, a power distribution base unit 1500 having a fifth configuration, and a universal platform 1560 in accordance with an exemplary embodiment. In this embodiment, each of the power distribution base units 1500 are removably attached to at least one of front, back, top, bottom or side mount surfaces of a respective one of the welding machine support units 1550. A universal platform 1560 is arranged for structural support of at least one of the power distribution base units 1500 and at least one of the welding machine support units 1550, each of the welding machine support units 1550 has equal or unequal external first, second, or third orthogonal dimensions, such that each of the power distribution base units 1500 is interoperable between any of the welding machine support units 1550. In an embodiment, the universal platform 1560 arrangement for structural support may include one or more fixed brackets, repositionable brackets, or additional integral mounting features such as repurposed apertures. Specifically, the universal platform 1560 provides a common base structure for various manufacturers and types of welding machine support units 1550, each having unique or distinctive external dimensions, wherein the universal platform 1560 is constructed to provide a shared common base that facilitates interconnection and thus interoperability of welding machine support units 1550 produced by various manufacturers which may be otherwise incompatible.

Figure 16:
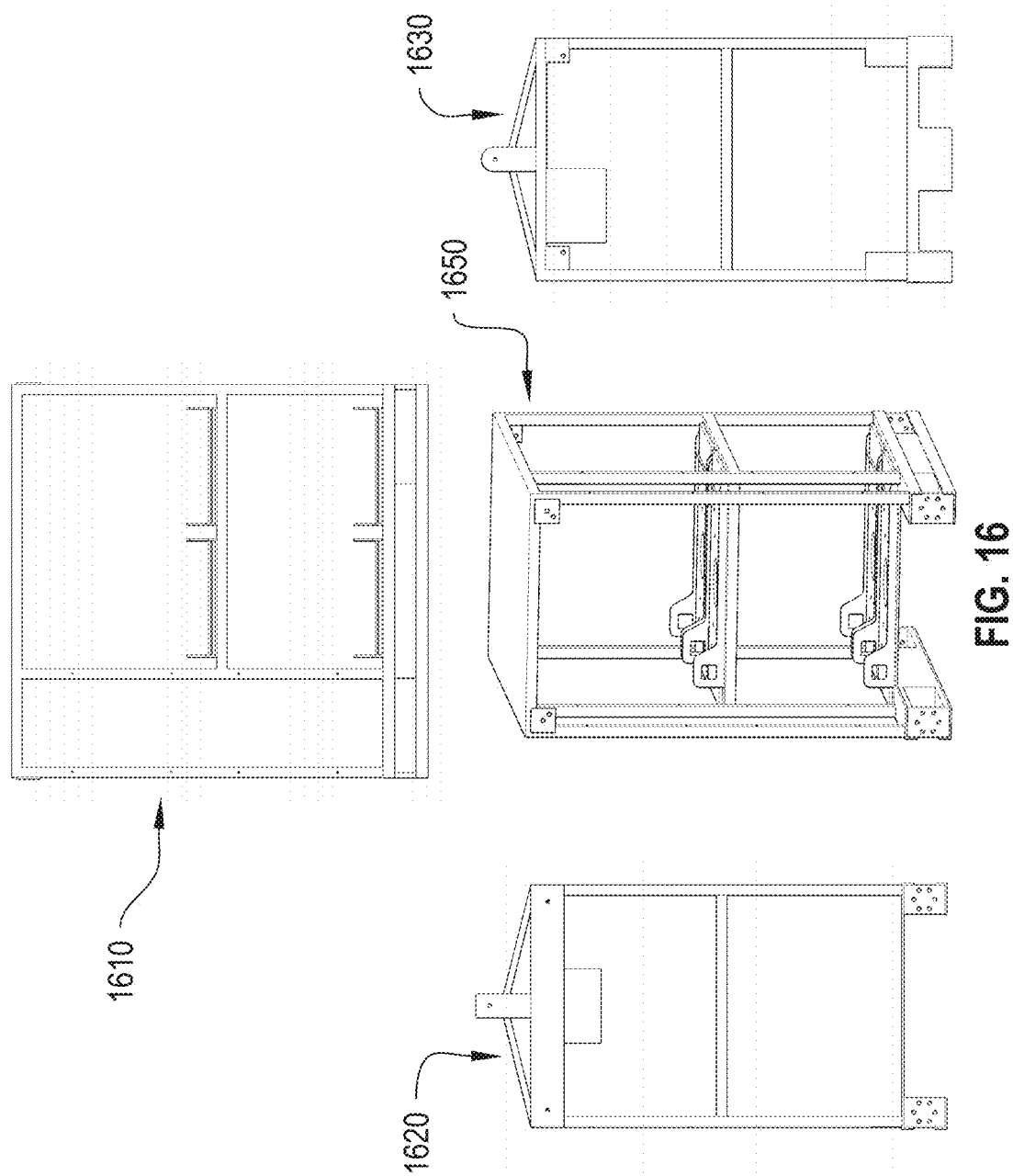
FIG. 16 is a perspective view of a various interconnectable welding machine support unit frames from various manufacturers that are usable in an interoperable power distribution system, in accordance with additional exemplary embodiments of the present invention.

FIG. 16 shows perspective views of various interconnectable welding machine support unit frames 1610, 1620, 1630, and 1650 from various manufacturers that are usable within an interoperable power distribution system, in accordance with additional exemplary embodiments. It should be noted that the interoperable power distribution apparatus and systems disclosed are also designed to fit both the 350 and 450/500 class of welding machine devices from known commercial manufacturers A, B, C, etc. Additionally, welding machine support unit frame depths of 35.5 inches or more allows for protection of commonly used Tweco® connectors installed on the front of the welding machine devices, which connectors are often damaged during transport. The instant invention is moreover compatible with a variety of other widely used industrial components such as Camlock electrical input connectors.

Returning now to FIG. 16, as depicted, each type of frame structure of the welding machine support units 1610, 1620, 1630, and 1650 from various manufacturers further comprises a plurality of elongated beams and shelves arranged to support said at least one prior art welding machine device (e.g., 530a, 530b, 531a, 531b, etc.) and the frame structures of the welding machine support units 1610, 1620, 1630, 1650 and N power distribution base units (e.g., 200, 1200, 1400, 1410, 1500, etc.) each comprise a plurality of fastening regions (e.g., 105, 115, 125, 703, 803, 1205, etc.) for removable attachment of at least another of said frame structure of said N welding machine support units 1610, 1620, 1630, 1650 and said N power distribution base units (e.g., 200, 1200, 1400, 1410, 1500, etc.) using components selected from at least apertures, pins, screws, bolts, clamps, nuts, washers, etc.

While the present invention has been illustrated by the description of exemplary embodiments thereof, and while the embodiments have been described in certain detail, there is no intention to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the general inventive concept.

The invention claimed is:

1. An interoperable power distribution apparatus comprising: N power distribution base units, said N power distribution base units having a first configuration wherein said N power distribution base units are each configured to be sequentially arranged along at least a first direction with at least another of said N power distribution base units such that said N power distribution base units when sequentially arranged along said at least said first direction are secured in sequence and removably attached; and a second configuration wherein said N power distribution base units are not configured to be secured in sequence along said at least said first direction, each of said N power distribution base units are independently and removably attached to at least one of front, back, top, bottom or side mount surfaces, or further embedded at least in part within a respective one of N welding machine support units, each of said N welding machine support units having equal or unequal external first, second, or third orthogonal dimensions, each of said N power distribution base units interoperable between any of said N welding machine support units, wherein N is a positive natural number between 1 and 100.

2. The interoperable power distribution apparatus of claim 1 wherein said N power distribution base units each further comprise a plurality of repositionable support brackets arranged along a surface of said N power distribution base units, said plurality of repositionable support brackets configured for positioning, movement, and secure repositioning of said plurality of repositionable support brackets for interoperability between said N welding machine support units constructed with said equal or unequal external first, second, or third orthogonal dimensions to accommodate removable attachment to a variety of types of said N welding machine support units.

3. The interoperable power distribution apparatus of claim 1 wherein said N power distribution base units are embedded said at least in part within said respective one of said N welding machine support units, said N power distribution base units each comprise a form factor allowing removable insertion within at least a portion of a perimeter of a frame of one of said N welding machine support units such that one of said N power distribution base units is partially or fully enclosed within said perimeter of said frame of said respective one of said N welding machine support units, said embedding allowing interoperability between said N power distribution base units and said N welding machine support units to accommodate removable attachment of said N power distribution base units to a variety of types of said N welding machine support units.

4. The interoperable power distribution apparatus of claim 1 wherein comprising a tool management center removably attached to said at least one of said front, back, top, bottom, side mount surfaces or embedded said at least in part within said N welding machine support units, said tool management center including components selected from a group consisting of a power tool storage bracket, a hand tool storage bracket, a cord reel, a cord storage bracket, and mountable enclosures for storage for work supplies, welding cables, extension cords, and lights.

5. The interoperable power distribution apparatus of claim 1 wherein said N welding machine support units further comprise power cable routing and wiring protection selected from a group consisting of arrangements of penetrations, conduits, cable trays, and raceways.

6. The interoperable power distribution apparatus of claim 1 wherein said N welding machine support units further comprise a securement mechanism for enclosure of one or more cavities selected from a group consisting of lockable doors, reclosable screens, front panels, back panels, top panels, bottom panels, and side panels.

7. The interoperable power distribution apparatus of claim 1 wherein said N welding machine support units further comprise a universal welding machine mounting system including a locking plate removably attached to surface of a welding machine device and a lockable carrier retainer for slidably receiving said locking plate, wherein when said welding machine device is attached to said locking plate and slidably received into said lockable carrier retainer, said welding machine device is securely held in position by said lockable carrier retainer.

8. The interoperable power distribution apparatus of claim 3 wherein said N power distribution base units are fully embedded within said respective one of said N welding machine support units, said N power distribution base units each comprise said form factor allowing removable insertion within a center portion of said perimeter of said frame of said one of said N welding machine support units, said N power distribution base units removably positionable between, above, or below one or more welding machine devices such that said one of said N power distribution base units is fully enclosed within said perimeter of said frame of said respective one of said N welding machine support units, said fully embedding allowing interoperability between said N power distribution base units and said N welding machine support units to accommodate removable attachment of said N power distribution base units to a variety of types of said N welding machine support units.

9. The interoperable power distribution apparatus of claim 1 wherein each of said N power distribution base units are removably attached to said at least one of said front, back, top, bottom or side mount surfaces of said respective one of said N welding machine support units, and a universal platform, said universal platform arranged for structural support of said at least one of said N power distribution base units and said at least one of said N welding machine support units, each of said N welding machine support units having equal or unequal external first, second, or third orthogonal dimensions, each of said N power distribution base units interoperable between any of said N welding machine support units.

10. The interoperable power distribution apparatus of claim 1 wherein said N power distribution base units each further comprise a plurality of fastening regions for removable attachment of said at least another of said N power distribution base units using components selected from a group consisting of apertures, pins, screws, bolts, clamps, nuts, and washers.

11. An interoperable power distribution system comprising: N welding machine support units each comprising a frame structure configured to support at least one welding machine device, each frame structure comprising a plurality of fastening regions for removable attachment of each frame structure to at least another of said frame structure; and N power distribution base units, said N power distribution base units having: a first configuration wherein said N power distribution base units are each configured to be sequentially arranged along at least a first direction with at least another of said N power distribution base units such that said N power distribution base units when sequentially arranged along said at least said first direction are secured in sequence and removably attached; and a second configuration wherein said N power distribution base units are not configured to be secured in sequence along said at least said first direction, each of said N power distribution base units are independently and removably attached to at least one of front, back, top, bottom or side mount surfaces, or further embedded at least in part within a respective one of said N welding machine support units along at least one of said fastening regions, each of said N welding machine support units having equal or unequal external first, second, or third orthogonal dimensions, each of said N power distribution base units interoperable between any of said N welding machine support units, wherein N is a positive natural number between 1 and 100.

12. The interoperable power distribution system of claim 11 wherein said N power distribution base units each further comprise a plurality of repositionable support brackets arranged along a surface of said N power distribution base units, said plurality of repositionable support brackets configured for positioning, movement, and secure repositioning of said plurality of repositionable support brackets for interoperability between said N welding machine support units constructed with equal or unequal external first, second, or third orthogonal dimensions to accommodate removable attachment to a variety of types of said N welding machine support units.

13. The interoperable power distribution system of claim 11 wherein each frame structure of said N welding machine support units further comprises a plurality of elongated beams and shelves arranged to support said at least one welding machine device; and said frame structure of said N welding machine support units and said N power distribution base units each comprise a plurality of fastening regions for removable attachment of said at least another of said frame structure of said N welding machine support units and said N power distribution base units using components selected from a group consisting of apertures, pins, screws, bolts, clamps, nuts, and washers.

14. The interoperable power distribution system of claim 11 wherein said N power distribution base units are embedded said at least in part within said respective one of said N welding machine support units, said N power distribution base units each comprise a form factor allowing removable insertion within at least a portion of a perimeter of said frame structure of one of said N welding machine support units such that one of said N power distribution base units is partially or fully enclosed within said perimeter of said frame structure of said respective one of said N welding machine support units, said embedding allowing interoperability between said N power distribution base units and said N welding machine support units to accommodate removable attachment of said N power distribution base units to a variety of types of said N welding machine support units.

15. The interoperable power distribution system of claim 11 wherein comprising a tool management center removably attached to said at least one of said front, back, top, bottom, side mount surfaces or embedded said at least in part within said N welding machine support units, said tool management center including components selected from a group consisting of a power tool storage bracket, a hand tool storage bracket, a cord reel, a cord storage bracket, and mountable enclosures for storage for work supplies, welding cables, extension cords, and lights.

16. The interoperable power distribution system of claim 11 wherein said N welding machine support units further comprise power cable routing and wiring protection selected from a group consisting of arrangements of penetrations, conduits, cable trays, and raceways.

17. The interoperable power distribution system of claim 11 wherein said N welding machine support units further comprise a securement mechanism for enclosure of one or more cavities selected from a group consisting of lockable doors, reclosable screens, front panels, back panels, top panels, bottom panels, and side panels.

18. The interoperable power distribution system of claim 11 wherein said N welding machine support units further comprise a universal welding machine mounting system including a locking plate removably attached to surface of one of said at least one welding machine device and a lockable carrier retainer for slidably receiving said locking plate, wherein when said one of said at least one welding machine device is attached to said locking plate and slidably received into said lockable carrier retainer, said one of said at least one welding machine device is securely held in position by said lockable carrier retainer.

19. The interoperable power distribution system of claim 14 wherein said N power distribution base units are fully embedded within said respective one of said N welding machine support units, said N power distribution base units each comprise said form factor allowing removable insertion within a center portion of said perimeter of said frame structure of said one of said N welding machine support units, said N power distribution base units removably positionable between, above, or below one or more of said at least one welding machine device such that said one of said N power distribution base units is fully enclosed within said perimeter of said frame structure of said respective one of said N welding machine support units, said fully embedding allowing interoperability between said N power distribution base units and said N welding machine support units to accommodate removable attachment of said N power distribution base units to a variety of types of said N welding machine support units.

20. The interoperable power distribution system of claim 11 wherein each of said N power distribution base units are removably attached to said at least one of said front, back, top, bottom or side mount surfaces of said respective one of said N welding machine support units, and a universal platform, said universal platform arranged for structural support of saic at least one of said N power distribution base units and said at least one of said N welding machine support units, each of said N welding machine support units having equal or unequal external first, second, or third orthogonal dimensions, each of said N power distribution base units interoperable between any of said N welding machine support units.

* * * * *